(12) United States Patent
Masuda et al.

(10) Patent No.: US 6,201,881 B1
(45) Date of Patent: Mar. 13, 2001

(54) EMBEDDING INFORMATION IN THREE-DIMENSIONAL GEOMETRIC MODEL

(75) Inventors: Hiroshi Masuda, Yamato; Ryutarou Ohbuchi; Masaki Aono, both of Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/084,480

(22) Filed: May 22, 1998

(30) Foreign Application Priority Data

May 27, 1997 (JP) .................................................. 9-137305

(51) Int. Cl.$^7$ .................................................. G06K 9/00
(52) U.S. Cl. ............................ 382/100; 382/154; 345/419
(58) Field of Search .................................... 382/100, 154, 382/232; 380/210, 287, 54; 345/419, 420, 421, 423

(56) References Cited

U.S. PATENT DOCUMENTS 5,636,292 * 6/1997 Rhoads .................................. 382/232
6,044,168 * 3/2000 Tuceryan et al. ..................... 382/118

OTHER PUBLICATIONS

Ohbuchi et al., "Watermarking Three–Dimensional Polygonal Models," Proc. 5th ACM Int. Conf. on Multimedia, Nov. 1997, pp. 261–272.*

Li et al., "3–D Motion Estimation in Model–Based Facial Image Coding," *IEEE Trans. on Pattern Analysis and Machine Intelligence*, vol. 15, No. 6, Jun. 1993, pp. 545–555.*

Essa et al., "A Vision System for Observing and Extracting Facial Action Parameters," *IEEE Proc. CVPR '94*, 1994 IEEE Computer Society Conf. on Computer Vision and Pattern Recognition, Jun. 21–23, 1994, pp. 76–83.*

\* cited by examiner

*Primary Examiner*—Andrew W. Johns
(74) *Attorney, Agent, or Firm*—Louis P. Herzberg

(57) ABSTRACT

Information is embedded in a three-dimensional geometric model in a visible or invisible state by changing geometric parameters of a three-dimensional geometric model. The three-dimensional geometric model comprises polyhedrons, lines, a set of points, or curved surfaces which are primitives (components) of the model. Each primitive is defined by a geometric parameter. The geometric shape of a three-dimensional geometric model is defined by a set of many geometric parameters. The information is embedded by changing the geometric parameters of a plurality of primitives constituting a three-dimensional geometric model.

22 Claims, 15 Drawing Sheets

FIG. 2A   FIG. 2B   FIG. 2C
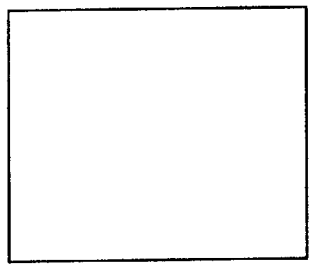 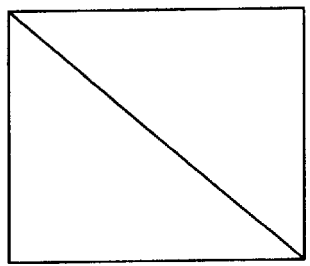 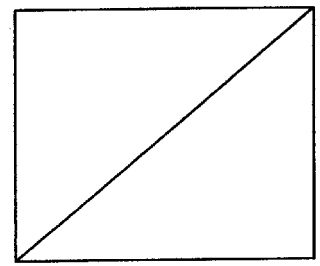
FIG. 3A
"0100010"
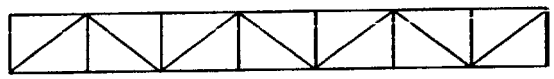
FIG. 3B
"0101010"

Meshes after pattern is embedded

Embedded pattern visualized by "drawing it in invisible ink"

Three-dimensional geometric model
— Polyhedron
— Line
— Set of dots
— Curved surface Geometric parameter
— Numerical parameter
  • Vertex coordinates
  • Length of line
  • Area of polygon
  • Volume of polyhedron
  • Two nondimensional values for defining triangle
— Topology
  • Vertex connective relation

EMBEDDING INFORMATION IN THREE-DIMENSIONAL GEOMETRIC MODEL

FIELD OF THE INVENTION

The present invention is directed to the field of information embedding. It is more specifically directed to hiding data in a geometric model.

BACKGROUND OF THE INVENTION

The providing image and voice signals on the internet as digital information has increased. Because this digital information can be easily reproduced, the embedding proprietary information and accounting information in the digital information is studied. The operation for such embedding of information is referred to as information embedding, information hiding, or watermarking.

A triangular mesh model is a three-dimensional-structure frequently used to transfer 3D data on the internet. Recently, 3D data can be displayed by browsers of various companies and therefore, it is estimated that this type of utilization of 3D data will increase. At the same time, it becomes an issue how to attach proprietary information and other accessory pieces of information (e.g. preparation date, preparer, and version) to the 3D data when distributing the 3D data.

Preparation of 3D data frequently requires the investment of a lot of time money and an aesthetic sensibility similar to that needed for photos and pictures. In the case of this type of data, the following copyright information is embedded in a 3D data file as a text comment.

COPYRIGHT (C) BY IBM JAPAN, LTD. 1996

IBM Japan, Ltd. has been authorized to freely distribute these Datasets. They are provided for unlimited use in existing or modified form. The actual Dataset (i.e. geometry) may not, however, be resold in existing or modified form.

However, the above copyright indication method is defenseless against a wicked revision by a third party. Because copyright information is erased or becomes invalid by performing the following.

First, it is possible to easily erase information written in a file as a text by text editing. Even if a text comment is enciphered by the PGP or DES method, it is easy to remove the enciphered information as if the information was not enciphered. Therefore, it is impossible to prevent modification of a copyright notice.

Moreover, when using a format conversion program for converting certain 3D source data into an object form for the three-dimensional geometric model a copyright notice is erased in the conversion and only the following character string is left.

Fri Jul 14 12:44:19 1997

Object converted by XXX-to-obj

At present, there is not any effective method for embedding proprietary information such as the signature of a proprietor or preparer in a model. Therefore it is an object of the present invention to embed various pieces of information in a three-dimensional geometric model.

Another object of the present invention is to embed information in a three-dimensional model for one or more of the following purposes:

Authentication of preparer
Confirmation of proprietor
Confirmation of receiver
Prevention of onerous reception
Control of preparation date
Stock control
Prevention of prohibited copy
Restraint of prohibited copy
Recording of secret information A further object of the invention is to accurately disembed the information embedded in the above three-dimensional geometric model.

SUMMARY OF THE INVENTION

The present invention uses a method for embedding various pieces of information in the three-dimensional geometric model under a visible or invisible state by changing geometric parameters of the three-dimensional geometric model. A three-dimensional geometric model normally comprises a polyhedron, a line, a set of points, or a curved surface which is a primitive (component) of the model. Moreover, each primitive is defined by geometric parameters. Therefore, the entire geometric shape of a three-dimensional geometric model is defined by a set of many geometric parameters.

In the case of the present invention, information is embedded by changing the geometric parameters of a plurality of primitives constituting a three-dimensional geometric model. Moreover, the present invention provides a method for embedding information by dividing geometric parameters into numerical parameters and topology.

A numerical parameter includes two nondimensional values for defining a vertex coordinate value, the length of a line, the area of a polygon, the volume of a polyhedron, or a triangle. Information is embedded by changing these values.

It is also possible to use the ratio between these two nondimensional values for defining a vertex coordinate value, the length of a line, the area of a polygon, the volume of a polyhedron, or a triangle as a numerical parameter.

The embedded information is disembedded by detecting the above changed geometric parameters.

Information is also embedded by changing topology for determining a vertex connective relation or the like.

Information can be embedded by combining the numerical parameters with the topology because change of the numerical parameters and change of the topology are independent from each other.

In this specification, a polyhedral model and a curved-surface model represent the following surface models.

Polyhedral model
Model comprising a polyhedron, line, and a set of points (Including both cases in which a vertex has connectivity and it does not have connectivity)

Curved-surface model
Model including a curved surface in addition to a polyhedron, line, and a set of points

BRIEF DESCRIPTION OF THE DRAWINGS

These and other objects, features, and advantages of the present invention will become apparent upon further consideration of the following detailed description of the invention when read in conjunction with the drawing figures, in which:

FIGS. 2(a) to 2(c) are illustrations showing a method for embedding information by making a symbol correspond to two cases of dividing a quadrangle into two triangles;

FIGS. 3(a) and 3(b) are illustrations showing a case of embedding a symbol string in meshes;

DETAILED DESCRIPTION OF THE INVENTION

Figure 13:
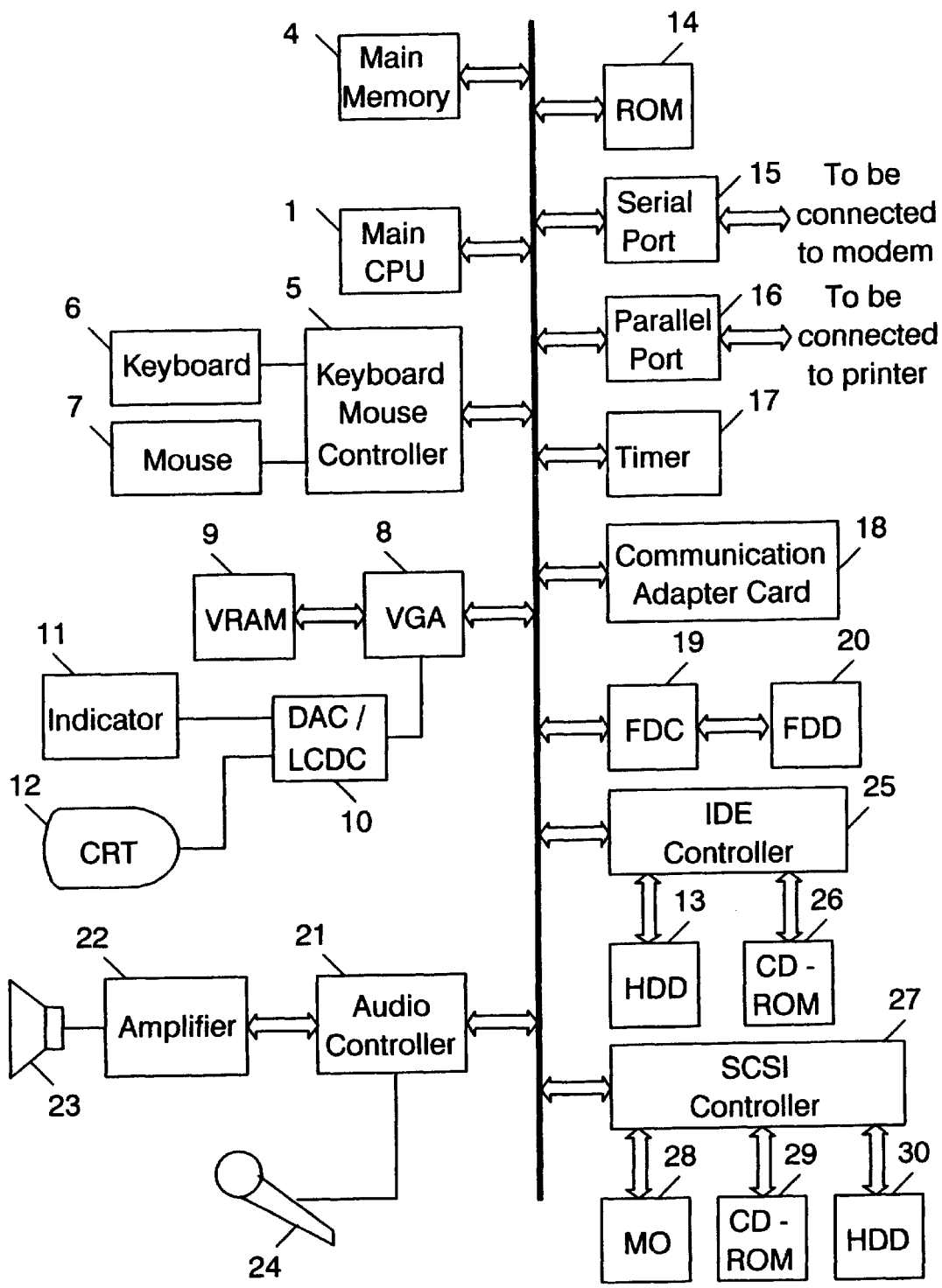
FIG. 13 is a block diagram of the hardware of a system used for the present invention.

The preferred embodiments of the present invention are described below by referring to the accompanying drawings. FIG. 13 is a schematic view showing an embodiment of the hardware structure of a system used for the present invention. The system 100 comprises a central processing unit (CPU) 1 and a memory 4. The CPU 1 and the memory 4 connect with a hard disk drive 13 serving as an auxiliary memory through a bus 2. A floppy disk drive (or a storage medium drive for an MO or CD-ROM) 20 is connected to the bus 2 through a floppy disk controller 19.

A floppy disk (or a storage medium such as an MO or CD-ROM) is set to the floppy disk drive (or a storage medium drive for an MO or CD-ROM) 20. It is possible to record the codes of a computer program for supplying an instruction to a CPU in cooperation with an operating system to execute the present invention in the floppy disk, the hard disk drive 13, or a ROM 14. The program is loaded in the memory 4 and run. It is also possible to record the codes of the computer program in a plurality of media by compressing them or dividing them into a plurality of groups.

The system 100 further comprises user interface hardware and moreover can have a pointing device (such as mouse or joy stick) 7 for inputting data, a keyboard 6, or display 12 for showing visual data for a user. Moreover, it is possible to connect a printer to the system 100 through a parallel port 16 or a modem to the system 100 through a serial port 15. Furthermore, it is possible to perform communication with other computer by connecting the system 100 to a network through the serial port 15 and modem or a communication adapter 18 (e.g. Ethernet or a token ring card).

A speaker 23 receives an aural signal converted from digital to analog values (digital-to-analog conversion) by an audio controller 21 through an amplifier 22 to output the signal as a voice. Moreover, the audio controller 21 converts aural information from analog to digital values (analog-to-digital conversion) received from a microphone 24 to make it possible to disembed aural information outside of the system to the system.

Thus, it will be easily understood that a system of the present invention can be using with a normal personal computer (PC), work station, notebook PC, palm top PC, network computer, various home electric appliances including a television having a built-in computer, game machine having a communication function, communication terminal having a communication function including a telephone, FAX, portable telephone, PHS, or electronic pocketbook, or combination of them. These components are illustrated but not all components are used as indispensable components of the present invention.

A three-dimensional geometric model stored in an external memory in HDD 13, HDD 30, MO 28, or CD-ROM 26 or in the main memory 4 is developed in a VRAM 9 and shown on a display 12. An image application stored in the main memory 4 is executed by the main CPU 1. The three-dimensional geometric model shown on the display 12 by the image application can be edited by the keyboard 6 or the mouse 7 serving as a pointing device.

It is possible to load information to be embedded in the main memory 4 or capture the information in the main memory 4 via the communication adapter card 18 or it is possible for a user to directly input the information by the keyboard 6 or a pointing device. The information is embedded by changing the geometric parameters of the three-dimensional geometric model in the main memory 4. In this case, it must be noted that change of the geometric parameters of the three-dimensional geometric model is equivalent to embedding of information. That is, the present invention discloses an art for embedding desired information by changing geometric parameters for forming a three-dimensional geometric model differently from an art such as texture mapping of drawing character information on a three-dimensional geometric model or pasting the information to the model.

Therefore, the difference of a geometric parameter between an original three-dimensional geometric model and an information-embedded three-dimensional geometric model embodies embedded information. Disembedding recovers the embedded information by detecting the changed parameter.

A plurality of techniques having various different features are divided into A. embedding technique, B. embodiment using the technique, and C. overall flows of embedding and disembedding and described in detail in accordance with the following contents. However, it must be kept in mind that change of the geometric parameters of the three-dimensional geometric model is equivalent to embedding of various types of information.

A. Embedding Technique
A.1 Constitution

It is an object of the present invention to embed any information in a three-dimensional geometric model comprising a set of points, lines, or triangles and factors in which they are connected with a connectivity.

To achieve the above mentioned, the present invention uses a method for embedding the information in the three-dimensional geometric model under a visible or invisible state by changing numerical parameters or topology serving as geometric parameters of the three-dimensional geometric model. A numerical parameter mainly represents a coordinate value and information is embedded by changing coordinate values of the components of the three-dimensional geometric model. A topology represents, for example, the number of vertexes or their connective relationship and information is embedded by changing the number of vertexes or connective relation.

Information is disembedded from a three-dimensional geometric model with the information embedded in it by detecting a changed geometric parameter (numerical parameter or topology) of the three-dimensional geometric model.

Figure 1A:
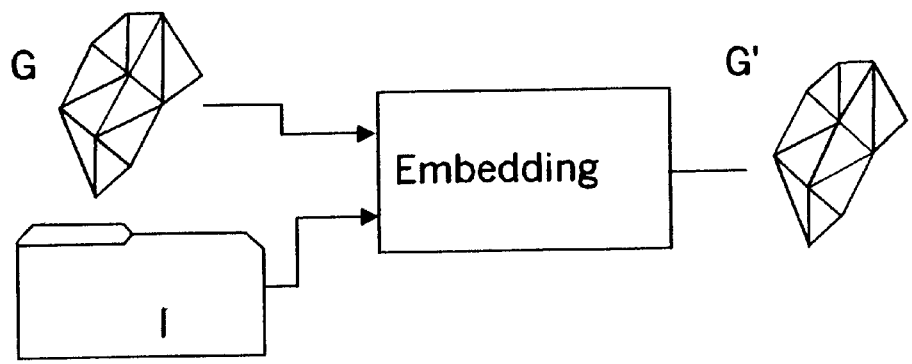
FIGS. 1(*a*) to 1(*c*) are illustrations showing operations for embedding and disembedding information in and from a three-dimensional polyhedral model of the present invention.
Figure 1B:
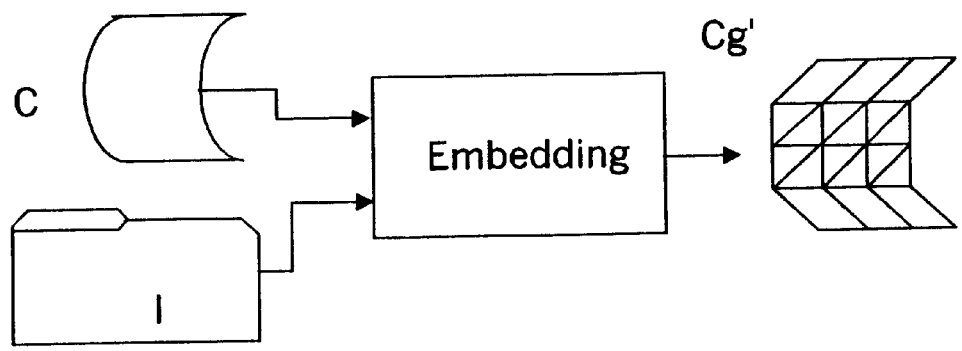
Figure 1C:
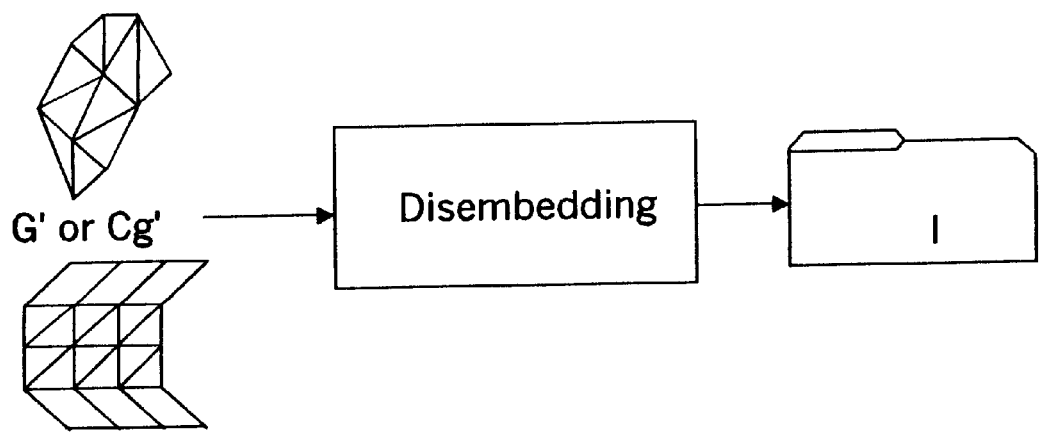

FIGS. 1(a) to 1(c) conceptually illustrate the operation for embedding information in a three-dimensional geometric model and the operation for disembedding the information from the three-dimensional geometric model, in which FIG. 1(a) shows the information embedding operation when the input is a polyhedral model G, FIG. 1(b) shows the information embedding operation when the input is a curved-surface model C, and FIG. 1(c) shows the operation for disembedding information from three-dimensional-structure polyhedral models (G', Cg').

As shown in FIGS. 1(a) and 1(b), both the polyhedral model G (including a case in which a vertex has a connectivity and it does not have a connectivity) and the curved-surface model C are accepted as inputs. In any case, information is embedded in the three-dimensional geometric model.

When the input is the curved-surface model C, polygon (e.g. triangle) mesh subdivision (see FIG. 1(b)) is performed simultaneously with information embedding. Therefore, the degree of freedom of the embedding technique rises in general. In the case of the polyhedral model G, the number of vertexes may be changed or not changed between an input and an output depending on the technique used for embedding information.

Figures 14, 15:
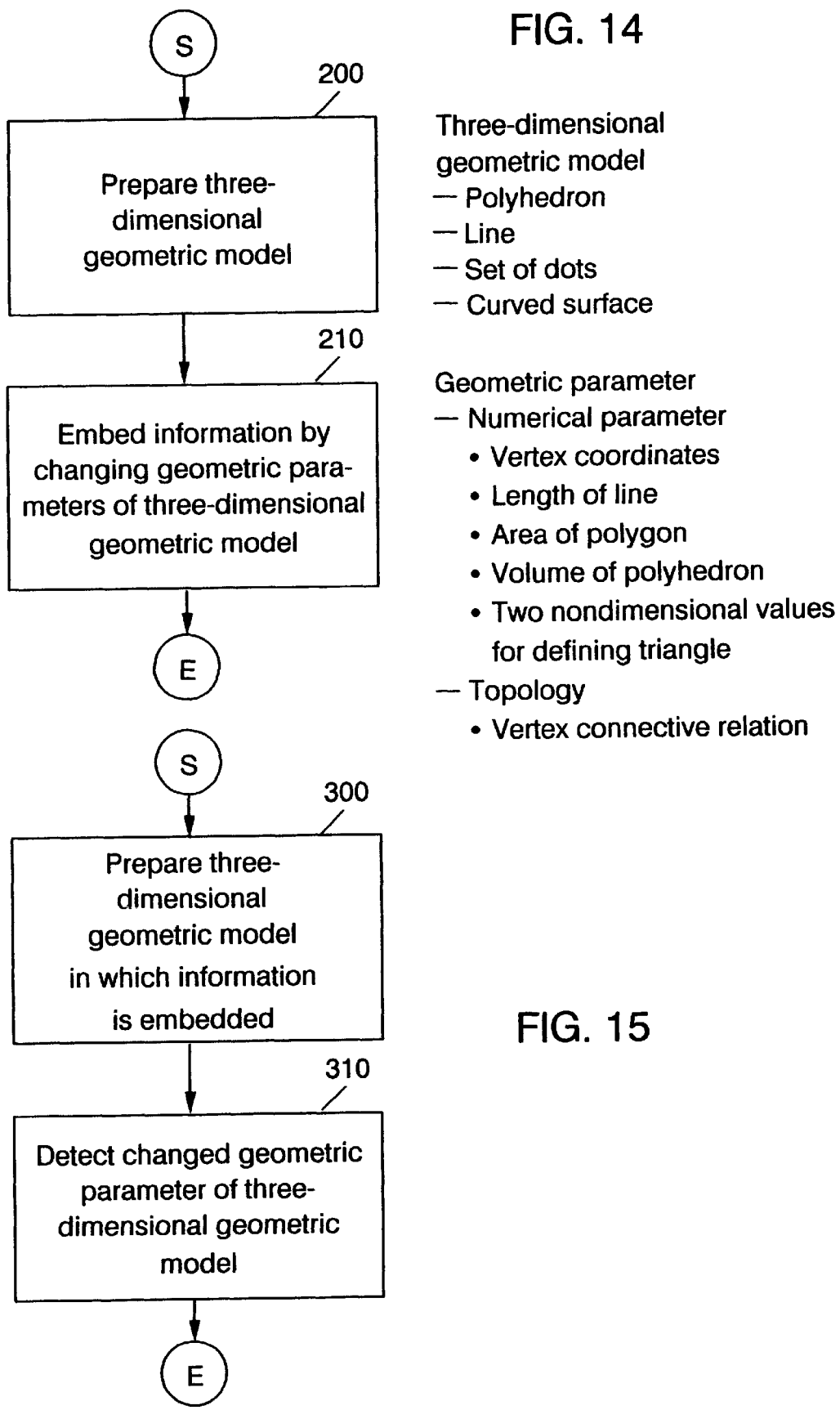
FIG. 14 is an illustration showing the outline of information embedding of the present invention.
FIG. 15 is an illustration showing the outline of information disembedding of the present invention.

FIGS. 14 and 15 show the outline of information embedding and that of information disembedding. In step 200 in FIG. 14, a three-dimensional geometric model is prepared. The three-dimensional geometric model comprises the polyhedron G, line L, a set of points P, or curved surface C. Then, in step 210, geometric parameters of the three-dimensional geometric model are changed. A geometric parameter includes a numerical parameter and topology. The numerical parameter is embodied into a vertex coordinate value, the length of a line, the area of a polygon, the volume of a polyhedron, or two nondimensional values for defining a triangle. The topology is embodied into topology for determining a vertex connective relation. These numerical parameters serving as three-dimensional geometric parameters embed information I by changing topology.

In the case of information disembedding, a three-dimensional geometric model in which the information I is embedded is first prepared in step 300 of FIG. 15. In step 310, a changed parameter is detected out of the geometric parameters of the original three-dimensional geometric model. In this step 310, the information I is disembedded from the three-dimensional geometric model by detecting a changed geometric parameter (numerical parameter or topology) of the three-dimensional geometric model. For further detailed description of the above steps 210 and 310, refer to the following description.

A.2 Two Techniques for Embedding Information

In this specification, the information embedding technique is classified into (1) symbol string embedding and (2) pattern embedding.

Embedding of information in a triangular polyhedron model by the symbol string embedding is embedding of a language L for expressing information. In this case, the language L is generated from alphabet A by a syntax G. Alphabet is constituted by A={0,1} in the case of a limited set of at least two independent symbols, for example, a binary number. The factor of L is a symbol string having an order. Therefore, to express L, it is necessary that:
1. all symbols of alphabet can be expressed and embedded in any form.
2. the order between one or more symbols can be expressed.

An information embedding method is specified depending on how to realize the above two items. Symbols and their order are embedded in the redundancy present in a model. In this case, the redundancy means "any value having optionality in a range of not influencing its purpose".

In the case of embedding of information in a polyhedral model in accordance with the pattern embedding, any pattern for expressing the information is embedded in a symbol string without encoding the pattern. This operation is similar to the operation for stamping a certain pattern (e.g. family emblem) on a shape model. A pattern to be embedded can be a character string such as "IBM". In this case, however, the order of characters is tacitly present and embedding is performed as one pattern to the last.

The symbol embedding is frequently an invisible embedding method in general. However, the pattern embedding has a feature that the patten embedding can be relatively easily seen (for example, it can be seen by wire frame indication).

A.2 Symbol String Embedding Technique
A.2.1 Symbol Embedding Technique

A symbol is a mass for expressing information and for example, one character of alphabet or binary one bit is considered as the symbol.

This application proposes a technique to be classified into two types as the symbol embedding method.

Embedding method according to coordinate value change: Changes vertex coordinates of a polyhedral model. Information is embedded by changing vertex coordinates, the length of a line, the area of a polygon, the volume of a polyhedron, the ratio or cross ratio between them, or two nondimensional values for defining a triangle.

Embedding method in accordance with topology change: Embeds information by changing topology for determining a vertex connective relation. A case is also included in which information is embedded by generating a polygonal mesh (when using a curved surface as the base) or recutting the mesh (when using a polyhedral model as the base) and changing the number of vertexes, and coordinates and topology.

A.2.1.1 Symbol Embedding Method According to Coordinate Value Change

A symbol is embedded in the change of various values generated by changing only coordinate values serving as numerical parameters of a three-dimensional geometric model. However, the number of vertexes and their connective relation are not changed. There are several basic values of a numerical parameter to be embedded and influenced by changing coordinates. The basic values used for this application are listed below.

Basic values
- Coordinate values of point
- Length of line
- Area of polygon
- Volume of polyhedron Moreover, the followings are used as values obtained by combining basic values.

Values to be changed by any one of the following transformations
- Coordinates of point Values invariant to translation and rotation
- Length of line
- Area of polygon
- Volume of polyhedron
- Acceptance or rejection of Delaunay condition Values invariant to translation, rotation, and uniform scaling
- Two nondimensional values for determining analogous triangles (e.g. Two angles of base)
- Area ratio between two polygons Values invariant to affine transformation
- Ratio between same linear lengths
- Area ratio between polygons on two parallel planes
- Ratio of volume between tetrahedrons Projective transformation invariant
- Cross-ratio between four points on line In this case, similarity transformation represents a combination of rotational, translational, and scaling transformations. A basic value is changed by any one of the similarity, affine, and projective transformations. The affine transformation includes the similarity transformation and the projective transformation includes the affine transformation. Therefore, among the transformations in the above four rough items, lower-positioned transformation is more general transformation. Acceptance or rejection of Delaunay condition represents a method for making whether each triangle of meshes meets the Delaunay condition correspond to a binary value.

Transformation invariant and embedding robustness: By embedding an invariant value in a certain transformation, the robustness is improved against the disturbance due to such type of transformation. To improve the robustness against a certain type of transformation, there is a method for correctly estimating an added transformation T, applying inverse transformation $T^{-1}$ to vertex coordinate values, and then disembedding information. For example, when realistically using a three-dimensional geometric model, the affine transformation is frequently used. To apply a embedding method that is robust to the affine transformation, it is necessary to perform the following.
(1) Using the volume ratio between tetrahedrons
(2) Estimating a transformation applied by any method, erasing the influence of the transformation by performing inverse transformation, and then disembedding information These two methods are explained in the specific information-embedding technique to be mentioned later.

Symbol embedding method: To embed a symbol in the above value, it is necessary to change redundant portions in view of the purpose in a certain value. Most simply, it is possible to rewrite some of the least significant bits of values not influencing the appearance of a model to the values of symbols to be embedded. It is a matter of course that the whole of the information to be embedded is not frequently included in one symbol in general. Therefore, it is necessary to embed information after preparing a symbol string obtained by ordering a plurality of symbols. The technique for ordering symbols is described later.

Improve the robustness of symbol embedding by vertex movement: Though the symbol embedding method using a least significant bit is easily implemented, it is not robust against the simple and effective destruction method for superimposing random numbers on vertex coordinates. By using the method for embedding to the least significant bit, information is destroyed when the magnitude of a random number to be superimposed becomes equal to or more than the least significant bit. When the input for information embedding is a plane covered with triangular meshes having connectivity or it is defined by a curved surface, there is a technique for improving the robustness against the destruction method according to superimposition of random numbers. To improve the robustness, it is necessary to know the curvature of the plane nearby each vertex and shift the vertex in the direction in which the curvature is minimized at the position of the vertex. Thus, it is possible to decrease the influence on the appearance of the model even if relatively greatly moving the vertex coordinates. The curvature nearby each vertex can be accurately calculated when the input is defined by a curved surface and moreover, the curvature can be approximately estimated even when the input is a plane defined by a polygonal mesh.

The embedding method according to the change of only vertex coordinates withstands the disturbance of changing only topology information when a vertex connective relation is not used to order symbols. For example, even when an indexed face set having a vertex in common is transformed into a set of independent triangles, embedded information is kept unless coordinate values are changed.

A.2.1.2 Symbol Embedding Method According to Topological Change

In the case of the embedding method according to topology change of a three-dimensional geometric model, information is embedded by changing vertex connective relations.

Quadrangle division method: FIGS. 2(a), 2(b), and 2(c) show a method for embedding information by making a symbol correspond to two cases of dividing a quadrangle into two triangles. The method for dividing the quadrangle in FIG. 2(a) into two triangles includes two types shown in FIG. 2(b) and 2(c). By making them correspond to such as 0 and 1, it is possible to embed a binary value.

In FIGS. 2(a) to 2(c), alphabet is made to correspond to several cases capable of dividing one polygonal mesh into a plurality of polygonal meshes. For example, two alphabetical characters (for example, binary notation {1,0}) are made to correspond to two cases capable of dividing one quadrangular mesh into two triangular meshes. In the case of this method, the symbol embedding operation does not change the number of vertexes or vertex coordinate values. However, a case is considered in which an input polyhedral model is remeshed (for example, meshes are fined to increase the information content) before symbol embedding according to topology change. Moreover, when a curved surface is used as an input, previous meshing is necessary as a matter of course.

Mesh fineness change method: FIGS. 3(a) and 3(b) show a case of embedding a symbol string in meshes. FIG. 3(a) shows a symbol embedding case using two cases of dividing a quadrangle into two triangles. FIG. 3(b) shows a case of embedding a symbol string by changing mesh finenesses. In FIGS. 3(a) and 3(b), information is embedded by locally changing mesh finenesses. When a polyhedral model is used as an input, mesh finenesses are changed by adding a vertex according to necessity. When a curved-surface model is used as an input, information is embedded by changing locally mesh finenesses of a curved surface. To encode information, it is necessary to set two or more mesh finenesses so as to correspond to alphabet. Moreover, there is a method for embedding symbols in accordance with the number of pieces obtained by dividing a quadrangular mesh (change of mesh finenesses).

A.2.2 Ordering of Primitives

To embed a practical amount of information, it is important to consider a set of primitives to be embedded, order the factors of the primitives, and encode information (data) by the set of all ordered primitives. As described above, the technique for embedding information in the set of the primitives once ordered can be classified into the following two types: symbol string embedding and pattern embedding. In the case of the symbol string embedding, a symbol such as one alphabetical character or numeral (1 or 0) of each digit of a binary number is made to correspond to each primitive to embed a symbol string in which all symbols are ordered. Most primitive arrangements have one-dimensional order but an order of two or more dimensions can be considered. In the case of the pattern embedding, a pattern which can be visually recognized by a person by visualizing the pattern is embedded in a set of two-dimensionally-ordered primitives in most cases.

To order primitives, it is necessary to (1) determine a start primitive and (2) determine the order of primitives starting with the start primitive.

The technique for ordering primitives is an order introduction method which can be classified into the following two types: topological ordering and quantitative ordering. On the contrary, it can be roughly classified into two in view of its locality; global ordering and local ordering.

A.2.2.1 Ordering Introduction Method

The following two methods are considered to introduce an order into a set of primitives of points or triangles.

Topological ordering: This method orders the symbol embedding units such as triangles or tetrahedrons by using a triangular polyhedral model as an input and moreover using a set of vertexes or the connectivity between triangles or tetrahedrons derived from the vertexes. For example, it is possible to cover a set of vertexes of orientable manifolds with a spanning tree to be uniquely determined by using a certain vertex as a start point. By traversing the spanning tree by a proper procedure (e.g. depth-first traverse), it is possible to introduce an order into a set of vertexes.

A large weak point of the topological ordering is that topology must be present in a set of vertexes. For example, the topological ordering cannot be directly applied to a set of points or triangles which does not have a connective relation to each other. To apply the topological ordering to a set of points having no connective relation, it is necessary to introduce topology by using Delaunay triangulation.

Quantitative ordering: This method notices values such as the length of a line, area of a triangle, and volume of a tetrahedron, or ratios between the values and entirely orders these values by sorting them. When a plurality of same values are present, it is necessary to break the same point by deflecting the values or shift to the next largest (or smallest) value by ignoring same-point values.

The quantitative ordering does not always assume the presence of topology. For example, even in the case of a set of triangles independent from each other (it is assumed that topology for forming vertexes into a triangle are present), it is possible to introduce an order in accordance with the difference between areas of triangles. When a set of points is given and the symbol embedding unit is a tetrahedron, it is necessary to introduce topology by combining vertexes according to Delaunay triangulation and form a set of tetrahedrons as a matter of course.

A.2.2.2 Locality of Order

The ordering technique can be classified into the following three types in view of its locality: global ordering, local ordering, and subscript ordering.

Global ordering: Orders all embedding primitives included in one embedding object. In general, this technique has a high space-utilization efficiency compared to two other techniques but it has a weak point that an order is easily destroyed.

Local ordering: Divides embedding primitives included in one embedding object into a plurality of independent subsets and orders the primitives in each subset. Each subset is formed on the basis of the nearness between embedding primitives (e.g. Euclidean-space nearness).

Subscript ordering: Though this is similar to the local ordering, its subset is very small (for example, approx. several primitives). This subset is referred to as a macro embedding primitive. The macro embedding primitive pairs with a symbol for encoding information (data) to embed a subscript showing the order of the symbol at the same time. A set of symbols is ordered by the subscript.

As the measure nearby two latter techniques, it is possible to use either of topological method (e.g. adjacency between vertexes of triangular mesh) or quantitative method (e.g. ratio between areas or Euclidean distance).

A.2.3 Robustness Improvement Technique

In this section, a technique is proposed which is effective for improvement of robustness against destruction of embedded information.

First, the following are listed as a whole: a plurality of techniques in which robustness properties are different from each other and compensation of mutual disadvantage by combining techniques for improving robustness. In addition the above, there are the following techniques.

A.2.3.1 Improvement of Robustness Against Global Transformation

A technique for improving robustness against global transformation (transformation is uniformly applied to the whole of global coordinates) includes the following two types: (1) using a value invariant to transformation (e.g. using a value invariant to affine transformation when assuming affine transformation, for example, using the volume ratio between two tetrahedrons) and (2) applying inverse transformation by estimating transformation.

To improve the robustness against local transformation, repetition of embedding is effective which is a technique for improving the robustness for cutout to be described later.

A.2.3.2 Improvement of Robustness Against Random Disturbance

To improve the robustness against the disturbance due to a calculation error, an expression error, or superimposition of random values in a method for embedding information by changing vertex coordinates, it is necessary to greatly change coordinates. However, when deflecting coordinates in random directions at a large amplitude, the quality of a model is deteriorated.

Binding of vertex coordinates in curved surface: When embedding and mesh dividing can be performed at the same time by using a curved-surface model as an input, it is possible to increase the moving distance of a vertex almost without changing the appearance of an output polyhedral model by binding the movement of vertex coordinates in the original curved surface. Originally, in the case of mesh dividing of a curved surface, a place where a vertex is generated has a high discretion. Information is embedded by properly using the discretion.

Moving of vertex in direction of minimum curvature of plane: To increase the amplitude for deflecting coordinates without changing the appearance of a model, it is effective to consider the tangential plane of a noticed vertex and move the vertex in the direction of smaller curvature in the tangential plane. To obtain a position or direction in which the curvature is small, it is more advantageous that an input for embedding information is specified by a model including a curved surface and transformation from the curved surface to a polyhedron and embedding of information are simultaneously performed as a part of information embedding. If the input is a polyhedral model, it is necessary to estimate a curvature nearby a given vertex by observing several vertexes nearby the vertex of the model.

Moving of vertex with normal vectors: (To be applied to a technique for moving vertex coordinates) In the case of a polyhedral model, a vertex normal vector is attached to the model and smooth shading is performed so as to smoothly display a portion which is originally a curved surface and which is approximated by a polyhedron as if it is a curved surface. In this case, the appearance of the model after smooth shading depends on not only the vertex coordinate position but also the vertex normal vector (or further depends on the vertex normal vector on occasion). Therefore, when the vertex normal vector is attached so that the portion looks like the original curved surface, it is possible to move the vertex coordinates at a large amplitude almost without changing the appearance.

When combining these three techniques, the quality of the model obtained as the result of the disturbance for erasing embedded information (e.g. superimposition of random numbers) is further deteriorated. Particularly, generating meshes on the basis of a curved surface and applying the above technique croup result in stronger restraint of stealing. This is because the stealing side cannot use the information for the original curved surface and thereby, it is very difficult to destroy the information by adding a regular disturbance not causing deterioration of the quality of the model (for example, concentrating the disturbance in the direction of the minimum curvature of the curved surface).

When it is assumed that the input of an information embedding program is a curved surface, the embedding procedure when combining these three techniques is as shown below. Conventionally in general, to transform a curved surface into a polyhedral model with a vertex normal vector, it is necessary to divide the curved surface into meshes and calculate the normal of each vertex. In the case of the present invention, the procedure is changed as shown below when embedding information.

(1) The curved surface is divided into meshes.
(2) Vertex coordinates are changed to embed information. In this case:
   A vertex is restrained so that it rides on the original curved surface (this is known from an input).
   The moving direction is set to the minimum curvature direction.
(3) The vertex normal vector is calculated by using the coordinates of each vertex after changed and the information for the original curved surface.

Thus, even if positions of a vertex considerably greatly change on the curved surface, a correct vertex normal vector corresponding to the new position is calculated and provided for a polyhedral model to be generated. By using this technique, the appearance of the model in which information is embedded after smooth shading is almost the same as the case of embedding no information in the model.

A.2.3.3 Improvement of Robustness Against Cutout or Local Transformation

Repetition of embedding: (To be applied generally) By repeatedly applying embedding to a plurality of portions in one model, the robustness against such disturbances as local deformation and cutout is improved. For information to survive, a local ordering having a spatial locality is used. Thus, the possibility for the information to survive rises even if an object in one model is divided into a plurality of pieces or a plurality of vertexes are removed.

A.2.3.4 Improvement of Robustness Against Information Decoding

Enciphering of information to be embedded: (To be applied to symbol string embedding) When the purpose of embedding information is to embed secret information which must not be known by the third party in a three-dimensional geometric model, it is also considered to previously encipher the information to be embedded in a symbol string. Thus, it is impossible to illegally read the information though it is possible to destroy the information. A method for disturbing the order of symbol strings by using a pseudo random-number system such as an M system is also classified into this method.

A.3 Pattern Embedding Technique

Then, to mainly perform visible embedding, several techniques for directly embedding not a symbol string but a pattern in meshes are described below.

A.3.1 Technique for Changing Topology and Coordinate Values

It is also possible to directly embed not a symbol string but a pattern in meshes. To use this technique, however, meshes must be complex to a certain extent. Therefore, to obtain meshes dense to a certain extent, it may be necessary to recut meshes when a polyhedral model is an input or generate a dense mesh when a curved surface model is an input. A case is most preferable for this type of method, in which the input is a curved-surface model and meshes can be generated freely to a certain extent.

Delaunay condition method: Embeds a pattern depending on whether meshes meet Delaunay condition.

Figure 4A:
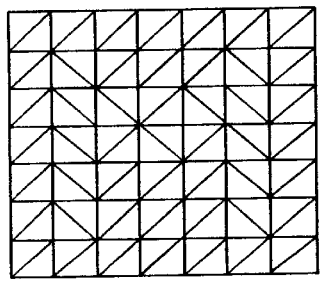
FIGS. 4(a) to 4(f) are illustrations showing a method for embedding pattern information in meshes.
Figure 4B:
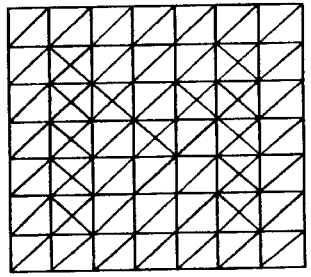
Figure 4C:
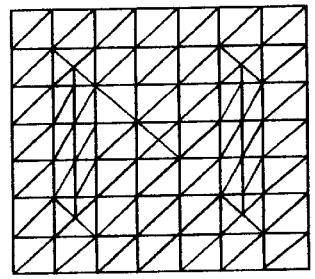

Polygon division method: Embeds an image pattern in several cases capable of dividing one polygonal mesh into a plurality of polygonal meshes. For example, it is possible to embed a binary image by assuming that two cases of dividing a quadrangle into triangles as white and black inks. FIG. 4(a) shows the case of dividing the quadrangle. FIG. 4(c) shows the case of making an embedded pattern easily visible.

Mesh fineness change method: Embeds visible pattern information by locally changing mesh finenesses. When a polyhedral model is used as an input, mesh finenesses are changed by adding a vertex according to necessity. When a curved-surface model is used as an input, it is preferable to embed information by changing mesh finenesses when mesh-dividing a curved surface.

Figure 4D:
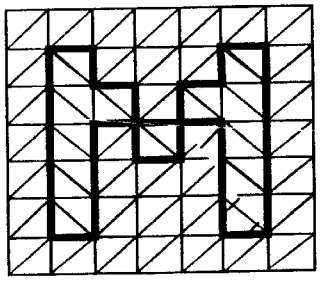
Figure 4E:
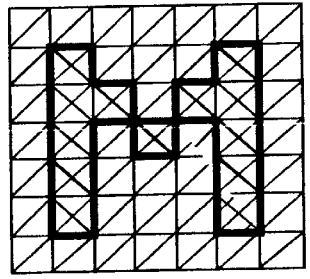
Figure 4F:
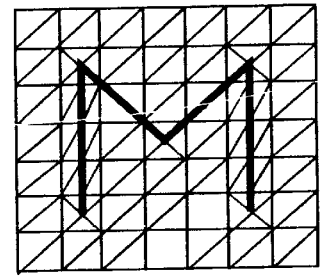

For example, a binary pattern is visually embedded by setting two mesh finenesses and assuming the finenesses as white and black inks. FIGS. 4(a) to 4(f) show a method for embedding pattern information in meshes. FIG. 4(a) shows a case of embedding pattern information by using two cases of dividing the quadrangle into two triangles. FIG. 4(b) shows a case of embedding pattern information by changing mesh finenesses. FIG. 4(c) shows a case of embedding a pattern by cutting meshes along a line drawing pattern. In FIGS. 4(d), 4(e), and 4(f), a quadrangle is shaded or an edge on a line drawing is thickly drawn in order to make a pattern easily visible. FIG. 4(d) is shaded so that the pattern of 4(a) may be easily visible. In FIG. 4(b), division of a quadrangular mesh is used as an example. However, it is possible to embed a binary or multiple-valued pattern by using a divided fineness of any polygonal mesh.

- Pattern cutting method: Embeds a pattern by using the pattern as a line drawing, moreover using the line as a trim curve to cut a polygon, and thereby forming a new mesh. (Refer to FIG. 4(c) and FIG. 4(f) which is made easily visible by thickening the trim curve.)

In the case of the above pattern embedding methods, an embedded result may be visible on a model. To perform invisible embedding, the above feature is a disadvantage. However, by positively using the above feature, it is possible to realize visible information embedding. For example, information to be embedded is formed into visible pattern information (e.g. shape of alphabetical character) and finenesses of meshes are changed only at the portion of a character. By wire-frame-displaying the mesh, it is possible to directly view a pattern when carefully viewing it.

Actually, however, a model becomes complex as shown in FIG. 4(a) (e.g. curved surface) or a pattern substantially becomes invisible by slightly improving the encoding method. Moreover, in the case of embedding according to acceptance or rejection of Delaunay condition, it is almost impossible to view the difference between meshes directly by a wire frame because change of meshes is small. For these cases, simple pattern visualization corresponding to "drawing in invisible ink" is necessary.

- Comment on robustness: Though to be shown later by a implemented Example of implementation and its experiment, visible embedding according to the above mesh subdivision has a robustness also for mesh simplification to a certain extent.

B. Embodiment

A plurality of information embedding techniques are described in the above "A. Embedding technique". Though these techniques can be independently used, it is also possible to use them as one specific technique by combining them. For example, a specific symbol-string embedding algorithm can be first made by combining a method for embedding a symbol in vertex coordinates with a method for ordering symbols. Moreover, it is possible to make a new technique by combining a technique for embedding a symbol in vertex coordinates with a technique for embedding a symbol only in topology (the number of vertexes is not changed or vertex coordinates are not changed). Several specific embodiments are described below.

B.1 Embedding in External Expression
B.1.1 Symbol String Embedding
B.1.1 Method for Embedding in Triangle Vertex Order in File
<Features>

Information is embedded by noticing the redundancy of face representation using vertices which can be seen in representation of connected triangles and is present in a format for representing a triangle by three vertexes having a connective relation each other. When vertexes A, B, and C determine a triangle, three vertex-appearance orders (including discrimination between surface and back) designate the same triangle, that is, three triangles (A, B, C), (B, C, A), and (C, A, B) are equal to each other. Information is embedded in this redundancy.

Though this is a very simple technique and easily realized, it is also easily destroyed.

<Input>

Triangular mesh data having topology $\{T_{i,j,k}, \{P_i\}\}$

<Technique>

Symbol embedding

Unit of symbol embedding: Triangle to be represented by external (file) format

Ordering technique: Appearance order of three sets of vertex indexes for representing triangles in file <Example of Implementation>

In the case of external expression (file format), a vertex index is cyclically shifted at a line where the vertex index of a certain triangle is present. The following is a portion obtained by cutting out a part of a shape model.

```
#VRML V1.0 ascii
# Creator: RSW (IBM Japan Ltd.) (C) 1996
Separator {
  Into {
  string
  "/afs/tr1.ibm.com/home/ohbuchi/rsw2/lightmove/c0.0.wrl"
  }
  LightModel {
    model BASE_COLOR
  }
  MaterialBinding {
    value PER_VERTEX_INDEXED
  }
  ShapeHints {
    vertexOrdering COUNTERCLOCKWISE
    shapeType SOLID
    faceType CONVEX
  }
  Separator {
    Material {
      ambientColor 0.000000 0.000000 0.000000
      diffuseColor 1.000000 1.000000 1.000000
      specularColor 0.000000 0.000000 0.000000
      transparency 0
      shininess 1.0
    }
    NoamalBinding {
      value OVERALL
    }
    Coordinate3 {
      point [
      1.461539 1.500000 -5.121172,
      1.505732 1.500000 -4.824445,
      0.516642 1.500000 -4.677134,
      0.472448 1.500000 -4.973861,
      0.989090 1.500000 -4.899153,
      1.011187 1.500000 -4.750789,
      0,966994 1.500000 -5.047516,
      1.247411 1.500000 -4.861799,
      1.225314 1.500000 -5.010162,
      0.752866 1.500000 -4.788143,
```

-continued

```
    0.730769 1.500000 -4.936507,
    0.763914 1.500000 -4.713962,
    1.258460 1.500000 -4.787617,
    1.214266 1.500000 -5.084344,
    0.719721 1.500000 -5.010689,
    ]
}
Material {
    ambientColor
    specularColor
    shininess
    transparency
    diffuseColor [
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
        1.000000 1.000000 1.000000,
    ]
}
indexedFaceSet {
    coordIndex [
    0,1,7,-1, 7,4,8,-1, 7,8,0,-1, 9, ### Notice this
line
    5,11,-1, 9,11,2,-1, 5,9,4,-1, 5,4,
    7,-1, 7,1,12,-1, 7,12,5,-1, 9,3,10,-1,
    9,10,4,-1, 3,9,2,-1, 8,6,13,-1, 8,
    13,0,-1, 6,8,4,-1, 6,4,10,-1, 10,3,
    14,-1, 10,14,6,-1, ]
    materialIndex [
    0,1,7,-1, 7,4,8,-1, 7,8,0,-1, 9,
    5,11,-1, 9,11,2,-1, 5,9,4,-1, 5,4,
    7,-1, 7,1,12,-1, 7,12,5,-1, 9,3,10,-1,
    9,10,4, -1, 3,9,2,-1, 8,6,13,-1, 8,
    13,0,-1, 6,8,4,-1, 6,4,10,-1, 10,3,
    14,-1, 10,14,6,-1, ]
}
}
```

At the line with the comment "Notice this line." nearby the end of the above portion, {0,1,7,-1} expresses a triangle obtained by connecting the 0th, 1st, and 7th vertex coordinates in this order (-1 being a terminator). In this case, because the three expressions {0,1,7,-1}, {1,7,0,-1}, and {7,0,1,-1} express the completely same triangle, it is possible to express three types of symbols by selecting these three expressions. The same is true not only for vertex coordinates but also for vertex colors and vertex normal vectors and they can be also used for information embedding.

<Robustness>

As long as topology information for the external and internal expressions of vertexes of a triangle is maintained, it is permitted that the coordinates of a vertex can be optionally changed. For example, it is possible to withstand local deformation or projective transformation of vertex coordinates.

B.2 Embedding in Internal Expression
B.2.1 Symbol String Embedding
B.2.1.1 Method for Embedding Triangle in Nondimensional Value <Feature>

A symbol is embedded in a nondimensional value of a triangle invariant to similarity transformation.

<Input>

Triangular mesh data $\{T_{i,j,k}, \{P_i\}\}$

<Technique>

Symbol string embedding

Embedding unit: A symbol is embedded by slightly deflecting two nondimensional values characterizing a set of similar triangles.

Ordering method: Local ordering performed by embedding an index in a plurality of basic units of embedding together with a symbol. To form a set to be embedded, the topological adjacent relation of four triangles (local ordering) is used.

<Example of Implementation>

Figure 5A:
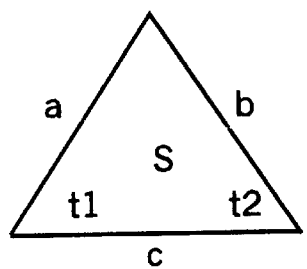
FIGS. 5(a) and 5(b) are illustrations showing a case of embedding information by using two nondimensional values of a triangle.
Figure 5B:
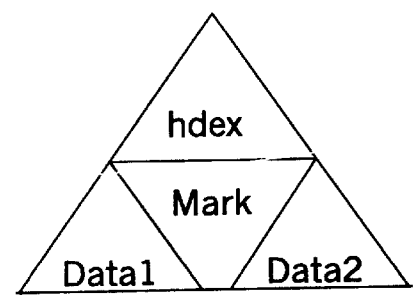

A symbol is embedded by slightly deflecting a set of two nondimensional values such as $\{b/a,c/a\}$, $\{S/(a*a),b/c\}$, or $\{t1,t2\}$ characterizing a set of similar triangles, where a,b, and c are the length of edges, and $t_1$ and $t_2$ are angles of a triangle, as shown in FIG. 5($a$).

Three triangles $T_1$, $T_2$, and $T_3$ sharing an edge with triangle T are selected. A certain value is embedded in T to show that data are embedded in T and its adjacent triangles $T_1$, $T_2$, and $T_3$.

FIGS. 5($a$) and 5($b$) show a case of embedding information by using two nondimensional values of a triangle. In FIG. 5($a$), sets of two nondimensional values characterizing a set of similar triangles include $\{b/a,c/a\}$, $\{S/(a*a),b/c\}$, $\{t1,t2\}$, and so on. On the basis of these sets, data, an index, and a mark are embedded in four triangles, which are handled as a macro-unit as shown in FIG. 5($b$).

<Application>

In the case of the above embedding methods, a technique (refer to A.3 Pattern embedding technique) can be applied which improves robustness against random disturbance of a vertex by selecting a vertex moving direction in accordance with the knowledge of an original curved surface and increasing a vertex moving distance without changing appearances.

FIGS. 6($a$) to 6($d$) show a technique for embedding information in a curved-surface model (sphere in this case), in which a curved-surface model is used as an input and four pairs of similar triangles are used as a unit to embed information. FIG. 6($a$) shows meshes triangulated without embedding on the basis of the curved-surface model of the sphere and FIG. 6($b$) shows meshes triangulated by embedding information. When limiting the movement of a vertex onto a previously given curved surface, an apparent change is small even if greatly moving the vertex (FIG. 6($b$)). Particularly, by calculating a normal vector from the original curved surface and giving it, an apparent difference provided with smooth shading is hardly produced (compare FIG. 6($c$) with FIG. 6($d$)).

In this case, the mesh in FIG. 6($b$) limits vertex movement within the curved surface by using the knowledge of the original curved surface in order to increase the vertex moving distance without changing appearances. Therefore, even if large vertex movement is performed as shown in FIG. 6($b$), the difference between appearances is hardly produced in a rendering result when performing smooth shading by using the normal vector calculated from the original curved surface at the position of the vertex after movement. FIG. 6($c$) shows the result of the smooth shading in FIG. 6($a$) and FIG. 6($d$) shows the result of the smooth shading in FIG. 6($b$). As the result of comparing FIG. 6($c$) with FIG. 6($d$), it is found that the difference between appearances is hardly produced in a rendering result. When destroying information by superimposing a random value on the model in FIG. 6($b$), the shapes of the model are clearly changed and the value of the model is deteriorated. Therefore, the significance of stealing is greatly decreased. As a further-advanced destruction method, a stealer can add random vertex movement in the direction along an original curved surface by estimating the original curved surface from an obtained triangular mesh. However, because the stealer cannot use the information for the original curved surface, he cannot accurately estimate the curved surface and the model shape is also deteriorated. Therefore, it is difficult to destroy information without deteriorating the value of the model.

The robusting method used in the above case is robust for similarity transformation because the method is applied to the embedding according to similar triangles. Moreover, when applying the robusting method to the embedding according to the volume ratio between tetrahedrons invariant to affine transformation, the method serves as an embedding method robust to the affine transformation and the random disturbance of vertex coordinates.

<Robustness>

The method withstands similarity transformation (translation, rotation, and scaling).

Because the local ordering is used, it can be expected that information is left and the left information can be disembedded even if a part of a model is eliminated or a topological structure is locally changed.

The robustness is further improved by repeating embedding and selecting a vertex moving direction according to the knowledge of an original curved surface.

B.2.1.2 Embedding Vertex Coordinates of Triangles

<Feature>

Because a vertex order is obtained from topological data, it is unnecessary to embed index information in embedding data having an order like string data (character data).

However, this method is not robuster than the method described in "B.2.1.4 Embedding in set of vertexes".

<Input>

Triangular mesh data $\{T_{i,j,k}\{P_i\}\}$

<Technique>

Symbol string embedding

Embedding object: Vertex coordinates

Ordering method: Determines any start vertex and determines the order of symbols by using topological data (information for connection between vertexes).

<Example of Implementation>

1. Vertex sorting can be made by determining a start vertex and the direction of an edge that includes the start vertex. Therefore, a mark is sequentially provided for initial several vertex strings obtained from a specific start vertex. For detecting the start vertex, all possible vertex sequences are examined by searching a specific mark. The calculation quantity is O(n).

2. For determining the vertex sequence a spanning tree (or its subset) is obtained on the basis of the start vertex and its direction. When the neighborhood of a vertex has the same topology as a plane (2-manifold), it is possible to uniquely determine the spanning tree in accordance with clockwise or counterclockwise, or depth-first or width-first.

3. An index is provided for a vertex in accordance with the order determined by the spanning tree.

4. Data is embedded by slightly shifting coordinate values in accordance with the order.

<Robustness>

This method withstands translation, rotation, and scaling.

B.2.1.3 Embedding in Volume Ratios Between Tetrahedrons

<Feature>

Symbols are embedded in the volume ratios between tetrahedrons serving as values invariant to affine transformation.

<Input>

Triangular mesh data $\{T_{i,j,k}\{P_i\}\}$

<Technique>

Symbol String Embedding

Embedding object: Symbols are embedded in the volume ratios between two tetrahedrons having triangles of meshes as its bottom face.

Ordering method: Local ordering performed by simultaneously embedding a marker, an index, and symbols in a "macro" embedding object. To select a set of embedding objects (macro-embedding objects), it is necessary to use the topological adjacent relation between four tetrahedrons (local ordering).

<Example of Implementation>

1. Triangles $t_a$ and $t_b$ are selected which are not present on the same plane but have an edge in common.

2. Four triangles $t_{1'}$, $t_{2'}$, $t_{3'}$, and $t_4$ are selected which share edges with $t_{a'}$ and $t_{b'}$.

3. The centers of gravity G of $t_{a'}$ and $t_b$ are calculated.

4. A reference volume $V_0$ is set to $(V_{t1}+V_{t2})/2$. (Many other expressions are considered. For example, $V_0$ can be larger than $(V_{t1}+V_{t2})/2$). In this case, $V_{ti}$ represents the volume of a tetrahedron formed with the center of gravity G and a triangle $t_i$.

5. By deflecting $V_0$ and the volume ratio $r_i = V_{ti}/V_0$ between four tetrahedrons having triangles $t_{1'}$, $t_{2'}$, $t_{3'}$, and $t_4$ as their bottom faces respectively, data is stored in the four tetrahedrons. To deflect the volume ratio, it is necessary to shift the vertex of each $t_i$ not shared with $t_{a'}$ or $t_{b'}$. Two marks and symbols and an index which show a macro embedding object are stored in four volume ratios $r_{1'}$, $r_{2'}$, $r_{3'}$, and $r_4$ respectively.

This algorithm is implemented and information is actually embedded. The embedded information is shown below.

Copyright (C) by IBM Japan, Ltd. 1996.

Model No. 124532

IBM Japan, Ltd. has been authorized to freely distribute these Datasets. They are provided for unlimited use in existing or modified form. The actual Dataset (i.e. geometry) may not, h This model comprises 1,025 triangles. By using this algorithm, it is possible to embed 238 8-bit characters.

Figure 7A:
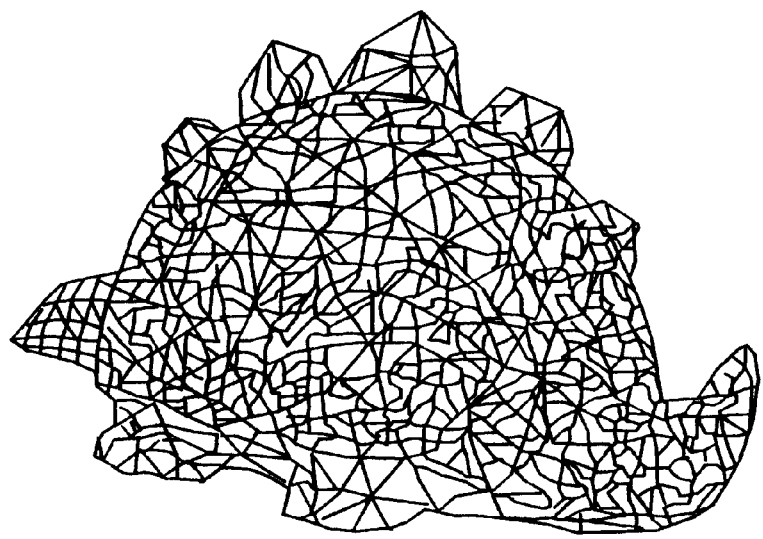
FIGS. 7(a) to 7(d) are illustrations showing a case of embedding information in a model by using a tetrahedron volume ratio.
Figure 7B:
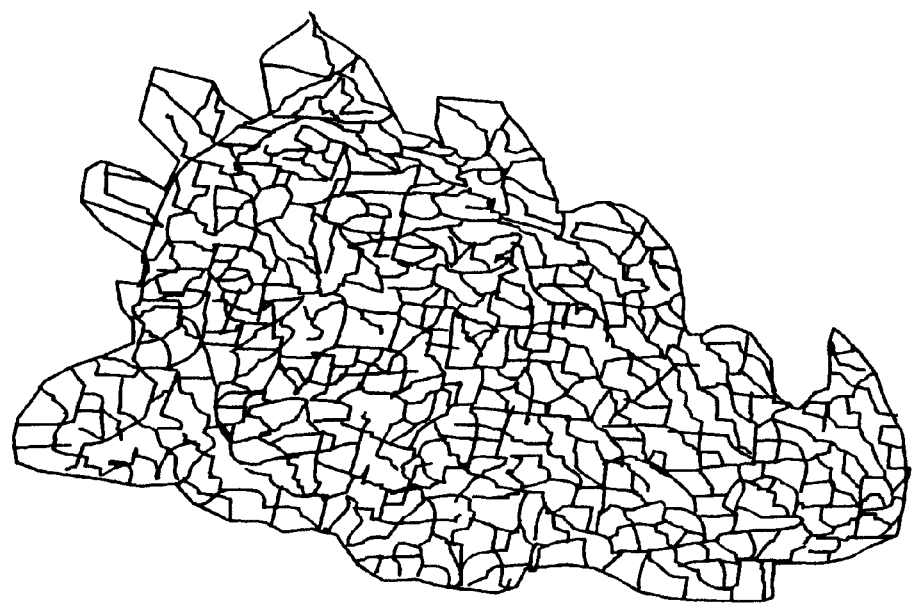
Figure 7C:
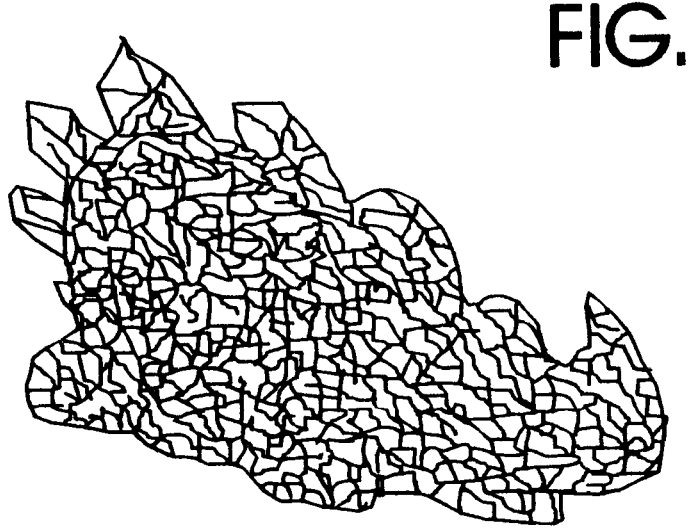
Figure 7D:
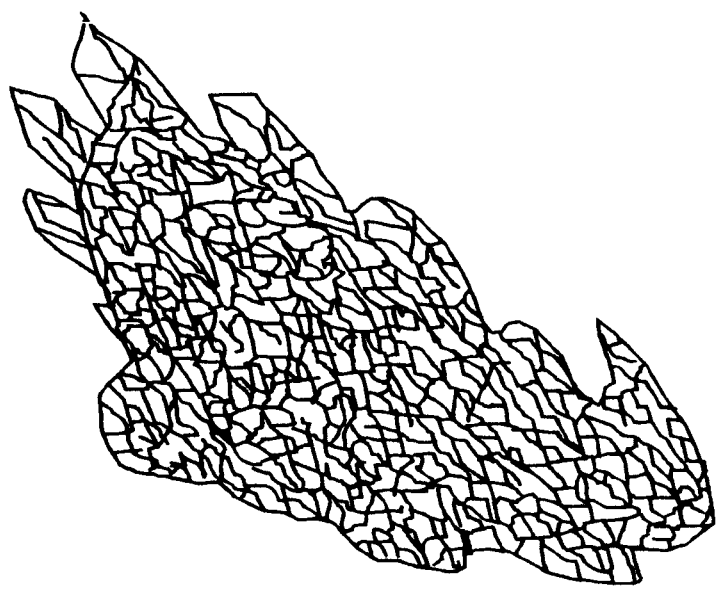

FIGS. 7(a) to 7(d) show a case of embedding information using volume ratios between tetrahedra a model with the format VRML 1.0. FIG. 7(a) is an illustration showing the original model by a wire frame. FIGS. 7(b), 7(c) and 7(d) show models obtained by applying a transformation including rotation, displacement, and scaling to the original model respectively. As the result of applying general affine transformation T including rotation, displacement deformation, and scaling to the original model three times and considerably deforming the shape of the model, information is stored with no problem.

<Robustness>

This method withstands translation, rotation, and scaling. This method also withstands affine transformation.

Even though a part of the model is erased, remaining information can be disembedded.

Even though topological structures are changed, information survives at a certain probability.

The robustness is further improved because of repetition of embedding and selection of a vertex moving direction according to the knowledge of the original curved surface (refer to A.2.3 Robustness improvement technique).

B.2.1.4 Embedding in Set of Vertexes

<Feature>

Topological information between vertexes of an input model is not assumed. Therefore, this method can be applied to the so-called polygon soup in which points, lines, polyhedrons (there is no topology between polyhedrons), and polyhedrons having connectivity are collected together.

<Input>

Set $\Lambda=\{P_i\}$ of three-dimensional vertexes P (x,y,z)

<Technique>

Symbol string embedding

Embedding unit: Vertex coordinates

Ordering method: An index and data are embedded in a triplet of coordinate values (x,y,z)

Embedding is performed in accordance with the following procedure. A set of points belonging to $\Lambda_1$ is used to estimate similarity transformation added later without adding the change by embedding. Data is embedded in the vertex of the factor of $\Lambda_2$.

1. The set of points is divided into $\Lambda_1$ and $\Lambda_2$ meeting the following relations by a method not depending on a coordinate system.

$\Lambda = \Lambda 1 \cup \Lambda_2$ $\Lambda 1 \cap \Lambda_2 = \Phi$

2. The following values not depending on a coordinate system are calculated from the set of points $\Lambda_1$.

Fixed point $O(x_0, y_0, z_0)$

Three independent orthogonal vectors $V_x$, $V_y$, and $V_z$

3. The factor of $\Lambda$ is transformed into a coordinate system determined by $O(x_0, y_0, z_0)$ and $V_x$, $V_y$, and $V_z$.

4. The coordinate values of each vertex of $\Lambda_2$ is slightly deflected to store a symbol.

In the case of disembedding, information is disembedded from each vertex of $\Lambda_2$ after estimating an added transformation from a set of points belonging to $\Lambda_1$ and applying the inverse transformation of the added transformation to the whole of a set of vertexes.

<Example of Implementation>

1. A three-dimensional convex hull is calculated by using the convex-hull calculation algorithm to discriminate vertexes $\Lambda_1$ (information is not embedded in these vertexes) on the convex hull from other vertexes $\Lambda_2$ (in the convex hull) (information is embedded in these vertexes by deflecting their position). The convex hull is not changed by similarity transformation or affine transformation.

2. The center of gravity of $\Lambda_1$ is assumed as the fixed point $O(x_0, y_0, z_0)$. Moreover, three orthogonal vectors $V_x$, $V_y$, and $V_z$ are calculated by using the covariant matrix of $\Lambda_1$.

In this case, the factor $C_{jk}$ of a covariant matrix C can be calculated as shown below.

$$\mu = \frac{1}{n}\sum_{i=1}^{n} p^i \quad \text{[Equation 1]}$$

$$\bar{p}^i = p^i - \mu$$

$$C_{jk} = \frac{1}{n}\sum_{i=1}^{n} \bar{P}^i_j \bar{P}^i_k, 1 \le j, k \le 3$$

In this case, "n" represents the number of vertexes of $\Lambda_1$. The intrinsic vector becomes three orthogonal vectors not depending on a coordinate system. Three vectors are discriminated in accordance with the distance up to the farthest vertex among the vertexes of $\Lambda_1$ from the center of gravity.

3. $\Lambda$ is coordinate-transformed by using the calculated center of gravity and intrinsic vector.

4. The operations in the above Items 2 and 3 are repeated until the value of the intrinsic vector converges into a certain tolerance.

5. Information is embedded in values x, y, and z slightly shifted from each vertex P(x,y,z) of $\Lambda_2$. In this case, for example, both the index and data are embedded in (x,y,z).

<Robustness>

This method withstands translation, rotation, and scaling.

This method withstands the change of topological (connection between vertexes) information.

B.2.2 Pattern Embedding

B.2.2.1 Embedding of Mesh in Acceptance or Rejection of Delaunay Property

<Feature>

The change of whether a triangle obtained as the result of mesh subdivision meets Delaunay condition depending on information is produced in the process in which a curved surface is used as an input, cut into meshes, and transformed into a polyhedral model. For example, the initial or the like of a copyright holder is embedded visibly to a certain extent. The information content which can be embedded is small.

Embedding according to acceptance or rejection of Delaunay condition can be also used for symbol string embedding.

<Input>

Model including curved surface

<Technique>

Pattern embedding

Figure 8A:
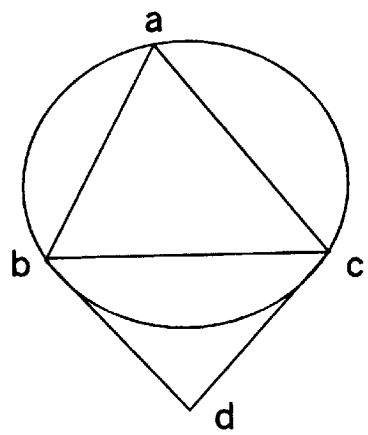
FIGS. 8(a) and 8(b) are illustrations showing triangles meeting Delaunay condition.
Figure 8B:
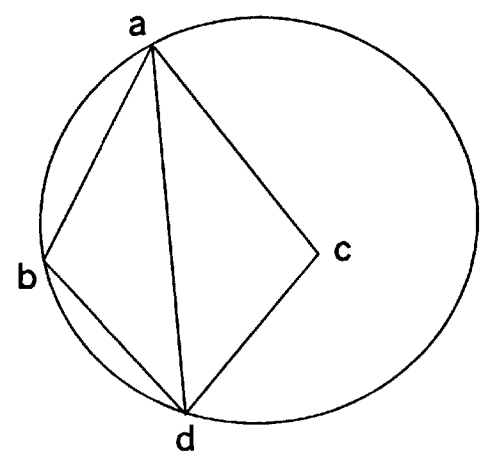
Figure 6A:
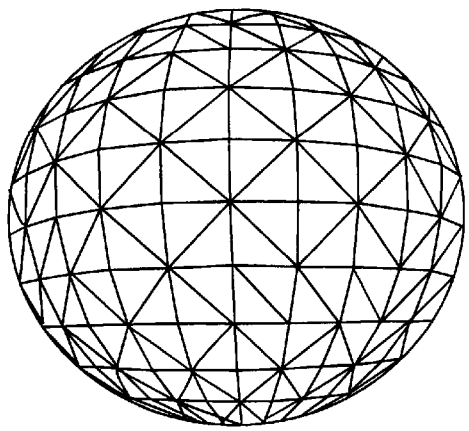
FIGS. 6(a) to 6(b) are illustrations showing a technique for embedding information in a curved-surface model.
Figure 6B:
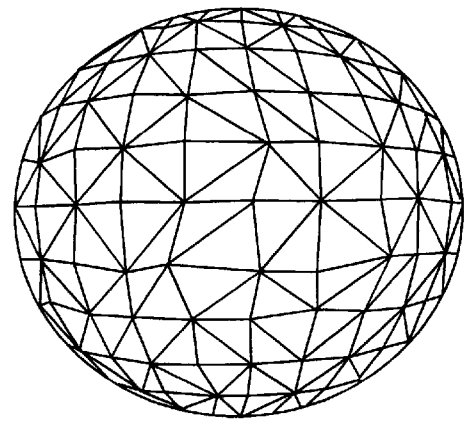
Figure 6C:
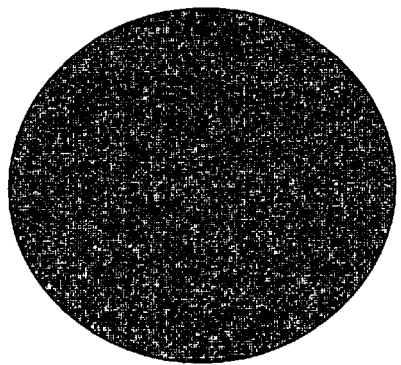
Figure 6D:
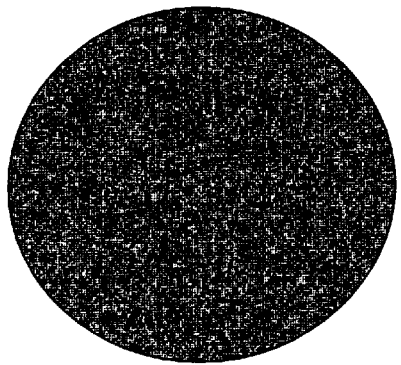

First, a purposed curved surface is cut into uniform meshes meeting Delaunay condition. Then, the meshes are changed at a portion corresponding to a visible watermarked pattern to be embedded so that the meshes do not meet Delaunay condition. Delaunay condition is a condition in which three vertexes of a triangle are present on a circular arc. For example, though FIGS. 8(a) and 8(b) show the same four points, a triangle present on the circular arc, that is, meeting Delaunay condition differs depending on how to apply topology. When embedding the pattern in a plane, it is easily erased due to polygonal simplification. Therefore, it is better to embed the pattern in the portion of a polyhedron for approximating a curved surface by using the curved surface as an input as much as possible.

FIGS. 8(a) and 8(b) show triangles meeting Delaunay condition. Triangles (a,b,c) meet Delaunay condition in FIG. 8(a) and triangles (a,b,d) meet the condition in FIG. 8(b).

<Example of Implementation>

Embedding according to acceptance or rejection of Delaunay condition is implemented.

Figure 9A:
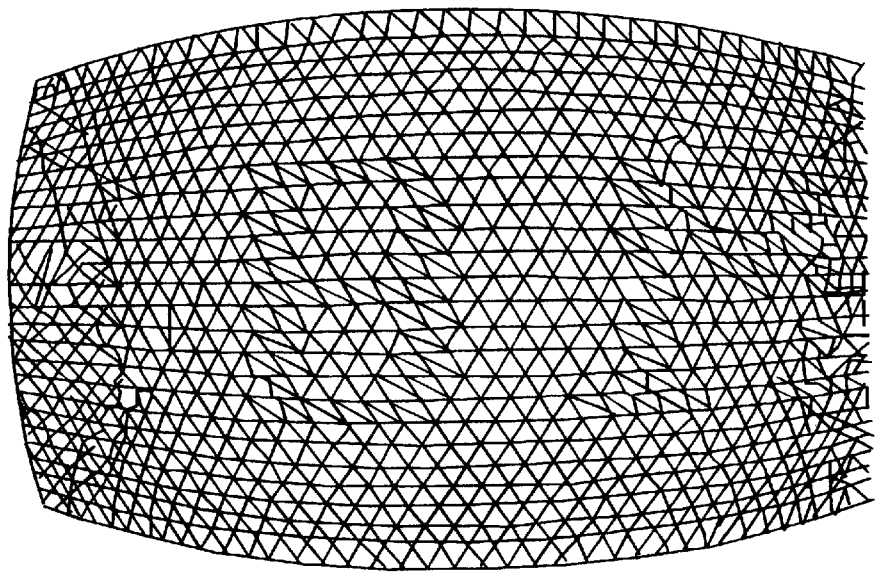
FIGS. 9(a) and 9(b) are illustrations showing a case of embedding a pattern according to acceptance or rejection of Delaunay condition.
Figure 9B:
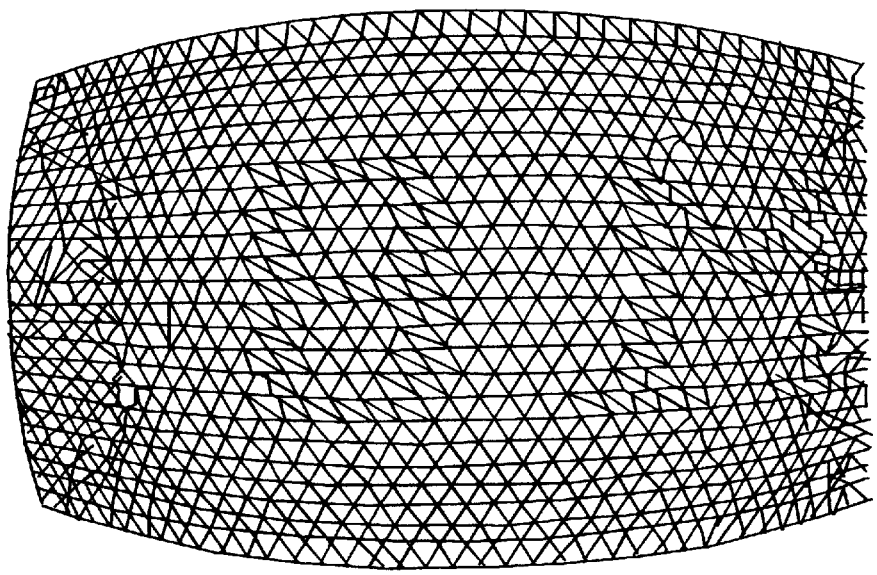

FIGS. 9(a) and 9(b) show examples of pattern embedding according to acceptance or rejection of Delaunay condition. The input is the definition of a curved surface and the output is a triangular mesh. FIG. 9(a) shows meshes after a pattern is embedded and FIG. 9(b) shows meshes obtained by "drawing the meshes in invisible ink" and visualizing it. In FIGS. 9(a) and 9(b), a curved surface (a part of spherical surface) is used an input to embed the character pattern of "IBM" by using acceptance or rejection of Delaunay condition when generating a triangular mesh.

<Robustness>

This method withstands almost all geometric transformations including local deformation (in which a transformed model has a significance). The method withstands polygonal simplification to a certain extent and a recognizable pattern is left.

B.2.2.2 Embedding in Mesh Subdivision Fineness

<Feature>

The mesh of an input model is recut to change the mesh fineness in accordance with information. Visible information such as the initial of a copyright holder is embedded. However, the information content to be embedded is small.

<Input>

Model including only a triangular polyhedron (with topological information) or a curved surface <Technique>

Most simply, the mesh fineness at a visible watermarked pattern to be embedded is increased up to two or four times larger than that at other portion. This is particularly effective when an input model is not a triangular polyhedron but a curved surface and meshes can be divided into triangles simultaneously with embedding. When the pattern is embedded in a plane, it is easily erased due to polygonal simplification. Therefore, it is preferable to embed the pattern in a polyhedron approximating a curved surface.

<Example of Implementation>

An algorithm for embedding information is implemented by changing mesh subdivision finenesses. The input is a curved surface and the output is a triangular mesh.

Figure 10:
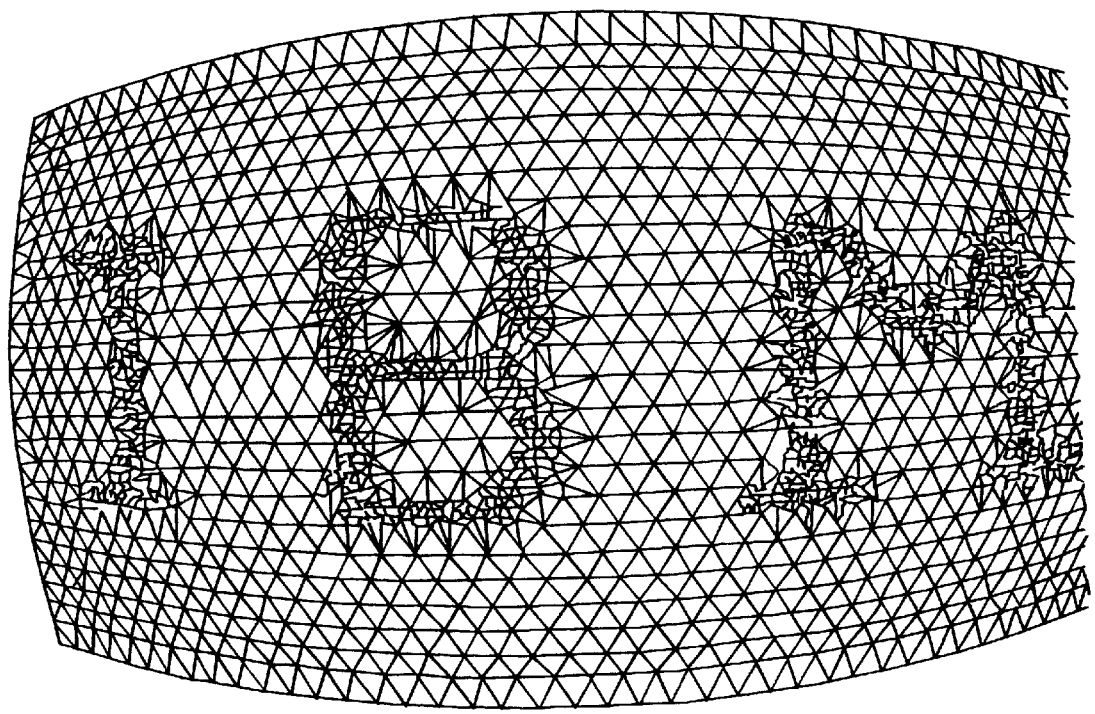
FIG. 10 is an illustration showing a case of embedding a pattern in a curved surface forming a part of a sphere.

FIG. 10 shows a case of using a curved surface forming a part of a sphere as an input and embedding a pattern by changing the mesh subdivision fineness to ¼. The number of triangles after embedding is 3,574.

Figure 11B:
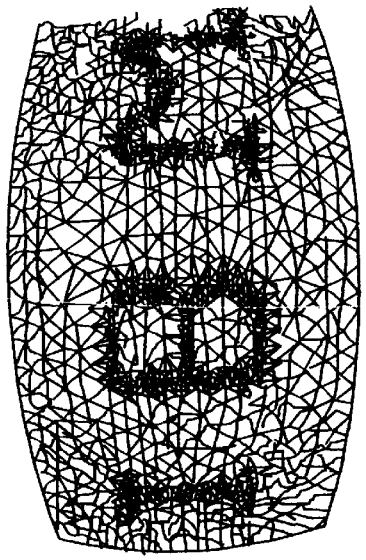
FIGS. 11(a) to 11(d) are illustrations showing a case of destroying pattern embedding according to mesh subdivision finenesses.
Figure 11D:
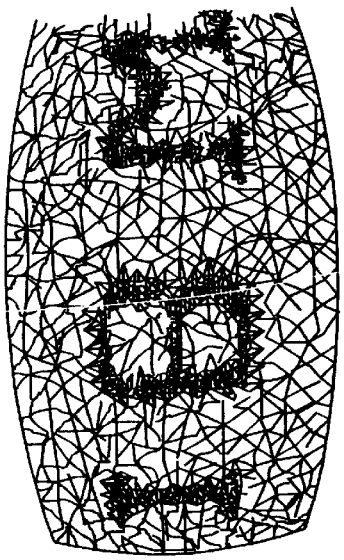
Figure 11A:
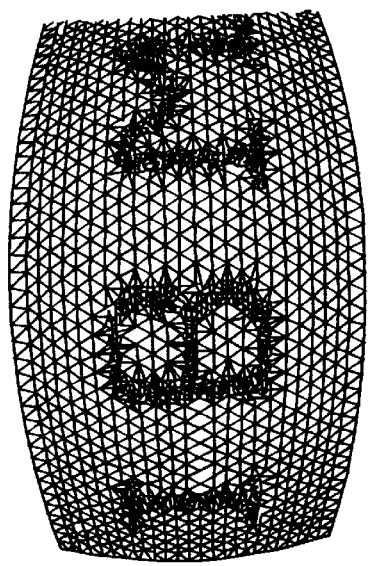
Figure 11C:
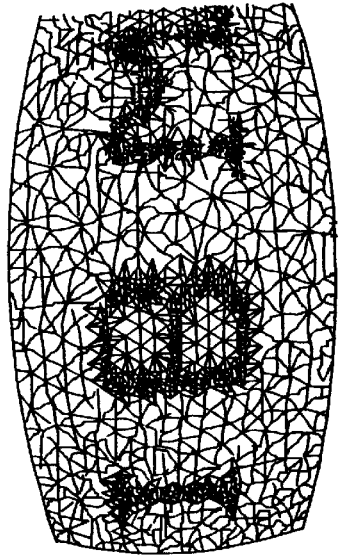
Figure 12B:
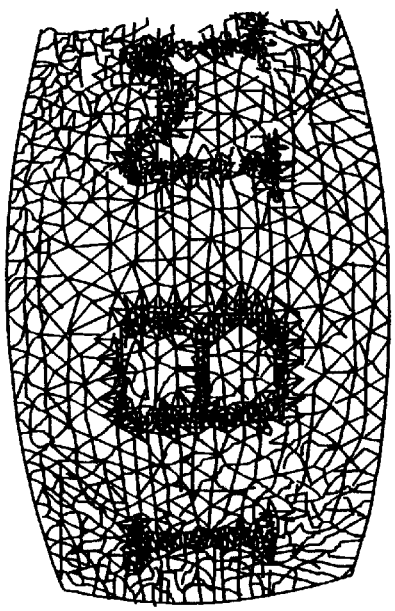
FIGS. 12(a) to 12(d) are illustrations showing another case of destroying pattern embedding according to mesh subdivision finenesses.
Figure 12D:
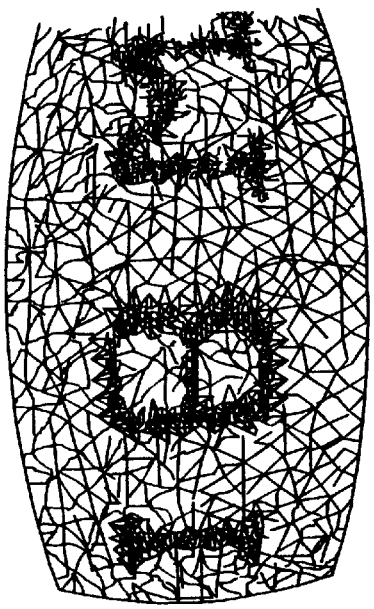
Figure 12A:
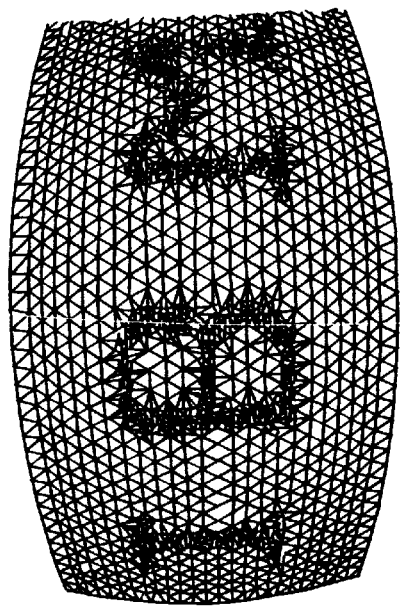
Figure 12C:
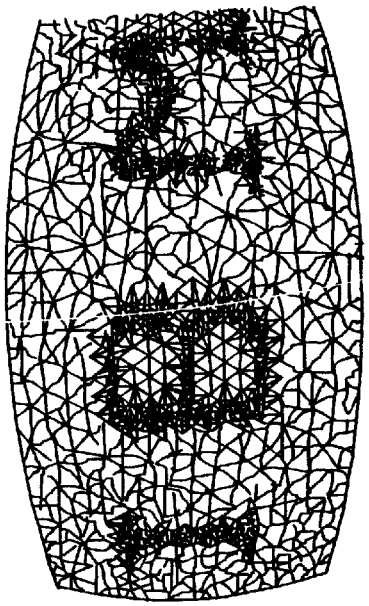

FIG. 11(a) shows a case of using a curved surface serving a part of a sphere as an input and embedding the pattern "IBM" by changing the meshing finenesses of the curve surface. At the pattern embedding portion in the above case, the mesh fineness is four times larger than that of other portion, and 3,754 triangles are used as a whole.

Moreover, FIGS. 11(a) to 11(d) show a case of destroying pattern embedding according to mesh subdivision finenesses by a mesh simplification algorithm A. The pattern is left to a certain extent even after the number of meshes is almost halved compared to the number of meshes (3,574) before simplification.

FIGS. 11(a), 11(b), 11(c), and 11(d) show how the pattern disappears when gradually simplifying triangular meshes by repeatedly applying the mesh simplifying operation A in order of (a)->(b)->(c)->(d). The mesh simplification algorithm A is an algorithm for remeshing a certain triangle by replacing the triangle with one vertex but it does not perform replacement when directions of a normal vector are greatly changed due to replacement. It is found that original patterns are still left to a certain extent even the meshes are simplified and the number of meshes comes to approx. a half or more.

FIGS. 12(a), 12(b), 12(c), and 12(d) show a case of destroying pattern embedding according to mesh subdivision finenesses by another mesh simplification algorithm B in order of (a)->(b)->(c)->(d). This simplification algorithm B is an algorithm for examining the distance between a plane, which is calculated by the minimum square method using adjacent vertices, and erasing the vertex if the distance is smaller than a threshold value. Also when applying the simplification algorithm B, it is found that the original pattern is left to a certain extent even after the number of polygons decreases to a half (1,374) the number of polygons before simplification (3,574) or less.

<Robustness>

This method withstands almost all geometric transformations including a local transformation (in which a transformed model has a significance).

This method withstands polygonal simplification to a certain extent.

C. Overall Flows of Embedding and Disembedding

Figure 16:
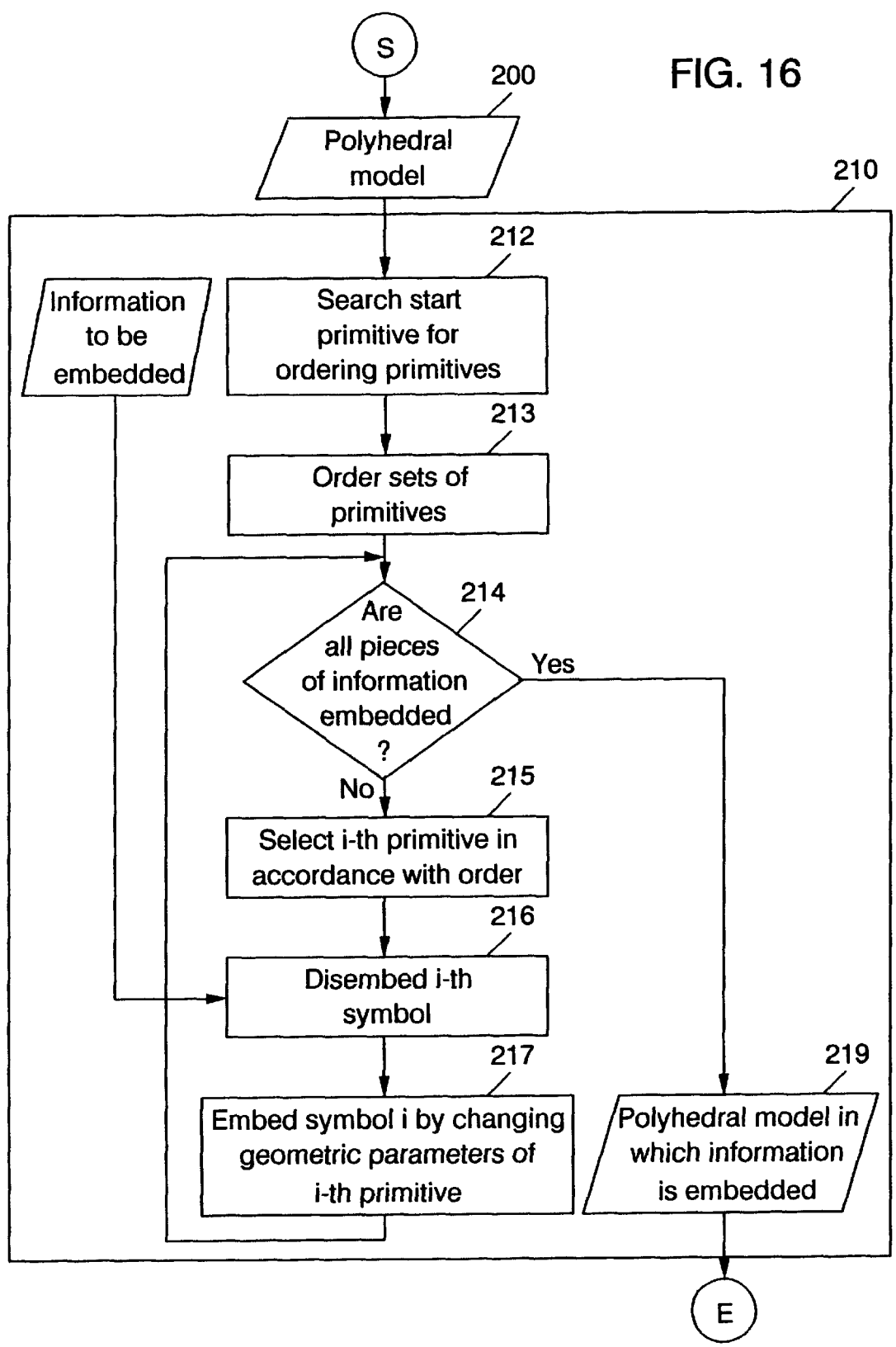
FIG. 16 is a flowchart of an information embedding method of the present invention.
Figure 17:
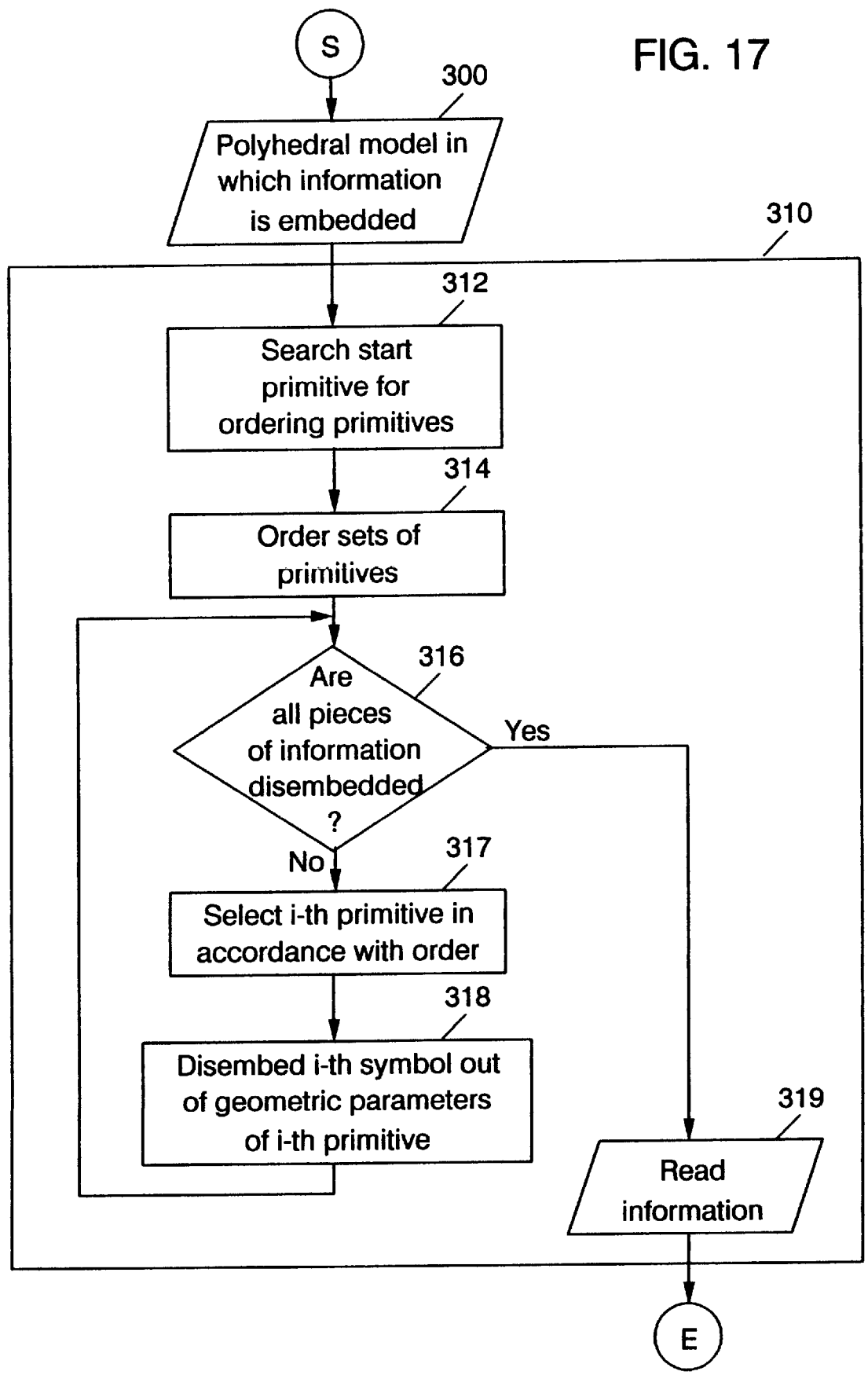
FIG. 17 is a flowchart of an information disembedding method of the present invention.

FIGS. 16 and 17 explain the overall flows for embedding a symbol string in a polyhedral model and disembedding it from the model out of a plurality of techniques having various different features used for the above embodiment. Other techniques are also generally performed by the same flows as the above.

C.1 Embedding Flow

FIG. 16 shows a flowchart for embedding information in a polyhedral model. First, in step 200, the polyhedral model to be embedded is prepared. Then, in step 212, a start primitive for ordering primitives constituting a three-dimensional geometric model is searched.

In this case, the start primitive is a primitive showing which primitive is ordered as the first primitive (as the initial condition). Moreover, giving the initial number to "which primitive in which direction" may be the initial condition. It is preferable that the initial condition is invariant to an estimated transformation and other disturbances similarly to the case of a geometric primitive because ordering may not be performed at the time of disembedding. Then, in step 213, sets of primitives are ordered.

Then, an embedding step is started. First, in step 214, it is judged whether to embed all pieces of information to be embedded. When the result is YES, a polyhedral model in which information is embedded is output in step 219. When the result is NO, the i-th primitive is selected in accordance with the order of primitives in step 215. Moreover, in step 216, the i-th symbol from the information to be embedded is disembedded. Finally, the geometric parameters of the i-th primitive are changed to embed the i-th symbol. Then, the processing returns to step 214.

C.2 Disembedding Flow

FIG. 17 shows a flowchart for disembedding the information embedded in a polyhedral model. First, in step 300, the polyhedral model in which information (at this point, it is unknown what it is) is embedded is prepared. Then, in step 312, a start primitive for ordering primitives is searched. Then, in step 314, sets of primitives are ordered.

Then, a disembedding step is started. First, in step 316, it is judged whether to disembed all pieces of embedded information. When the result is YES, the disembedded information is output in step 319. When the result is NO, the i-th primitive is selected in step 317 in accordance with the order of primitives. Moreover, in step 318, the i-th symbol is disembedded from the geometric parameter of the i-th primitive. Then, the processing returns to step 319.

[Advantages of the Invention]

The present invention makes it possible to safely embed various pieces of information in a three-dimensional geometric model expressed by sets of points, lines, and polyhedrons. The information embedding method of this specification can be used to protect the proprietary information of a 3D model. Moreover, it is possible to incorporate embedding and disembedding programs into three-dimensional-shape modeling software or use the disembedding program by combining it with a browser.

It is noted that this invention may be used for many applications. It also provides . . . Although the description is made for particular arrangements and applications, the intent and concept of the invention is suitable and applicable to other arrangements and applications. For example, the types, sizes and shapes of . . . in various combinations of . . . It will be clear to those skilled in the art that other modifications to the disclosed embodiments can be effected without departing from the spirit and scope of the invention.

What is claimed is:

1. A system for embedding information in a three-dimensional geometric model comprising:
   a) means for preparing a three-dimensional geometric model wherein said three-dimensional geometric model comprises a plurality of primitives, and
   b) means for embedding said information in said three-dimensional geometric model by changing a geometric parameter of said three-dimensional geometric model wherein said means for embedding includes:
      i) means for searching a start primitive for ordering primitives,
      ii) means for ordering sets of primitives in the plurality, and
      iii) means for selecting a primitive in the sets in accordance with said order and changing the geometric parameter of the selected primitive correspondingly to said information.

2. The system according to claim 1, wherein said selected primitive is a polyhedron, a line, a set of points, or a curved surface.

3. The system according to claim 2, wherein said information is a symbol corresponding to a specific language, a pattern showing said information, or a combination of said symbol with said pattern.

4. The system according to claim 3, wherein said geometric parameter is a numerical parameter.

5. The system according to claim 4, wherein said numerical parameter is a vertex coordinate value, the length of a line, the area of a polygon, the volume of a polyhedron, or two nondimensional values for defining a triangle.

6. The system according to claim 4, wherein said numerical parameter is the ratio between a vertex coordinate value, the length of a line, the area of a polygon, the volume of a polyhedron, and two nondimensional values for defining a triangle.

7. The system according to claim 3, wherein said geometric parameter is topology.

8. The system according to claim 7, wherein said topology is topology for determining a vertex connective relation.

9. The system according to claim 3, wherein said geometric parameter is a combination of a numerical parameter and topology.

10. A method for embedding information in a three-dimensional geometric model, comprising the steps of:
    a) preparing a three-dimensional geometric model wherein said three-dimensional geometric model comprises a plurality of primitives,
    b) embedding said information in said three-dimensional geometric model by changing the geometric parameter of said three-dimensional geometric model wherein said means of embedding information includes the steps of;
       i) searching a start primitive for ordering primitives,
       ii) ordering sets of primitives in the plurality of primitives, and
       iii) selecting a primitive from one of the sets in accordance with said order and changing a geometric parameter of the selected primitive correspondingly to said information.

11. The method according to claim 10, wherein said selected primitive is a pollyhedron, a line, a set of points, or a curved surface.

12. The method according to claim 11, wherein said information is a symbol corresponding to a specific language, a pattern showing said information, or a combination of said symbol with said pattern.

13. The method according to claim 12, wherein said geometric parameter is a numerical parameter.

14. The method according to claim 13, wherein said numerical parameter is a vertex coordinate value, the length of a line, the area of a polygon, the volume of a polyhedron, or two nondimensional values for defining a triangle.

15. The method according to claim 13, wherein said numerical parameter is the ratios between vertex coordinate values, the length of lines, the areas of polygons, the volumes of a polyhedras, and two nondimensional values for defining a triangle.

16. The method according to claim 12, wherein said geometric parameter is topology.

17. The method according to claim 16, wherein said topology is topology for determining a vertex connective relation.

18. The method according to claim 12, wherein said geometric parameter is a combination of a numerical parameter and topology.

19. A system for disembedding information embedded in a three-dimensional geometric model, comprising:
    a) means for preparing a three-dimensional geometric model in which said information is embedded; and
    b) means for disembedding said information from said three-dimensional geometric model by detection a geometric parameter of said three-dimensional geometric model wherein the information disembedding means includes;
       i) means for searching a start primitive for ordering primitive,
       ii) means for ordering sets of primitives in the plurality, and
       iii) means for selecting primitives in accordance with said order and disembedding said information from the geometric parameter of said selective primitives.

20. A method for disembedding information embedded in a three-dimensional geometric model, comprising the steps of:
    a) preparing a three-dimensional geometric model in which said information is embedded wherein said three-dimensional geometric model comprises a plurality of primitives; and
    b) disembedding said information from said three-dimensional geometric model by detecting a geometric parameter of said three-dimensional geometric models wherein disembedding said information includes the steps of:
       i) searching a start primitive for ordering primitives, ordering sets of primitives in the plurality, and
       iii) selecting a primitive in a set in accordance with said order and disembedding said information from a geometric parameter of the selected primitive.

21. A computer program on a computer usable medium for making a computer embed information in a three-dimensional geometric model, wherein said program has;
    a) model software for preparing a three-dimensional geometric model wherein said three-dimensional geometric model includes a plurality of primitives, and
    b) embedding software for embedding said information in said three-dimensional geometric model by changing a geometric parameter of said three-dimensional geometric model wherein said embedding software includes:
       i) software for searching for a start primitive for ordering primitives,
       ii) software for ordering sets of primitives in the plurality of primitives, iii) software for selecting a primitive from one of the sets in accordance with said order and changing a geometric parameter of said primitive corresponding to said information.

22. A computer program on a computer usable medium for making a computer disembed information embedded in a three-dimensional geometric model, wherein said program has;

1) model software for preparing a three-dimensional geometric model in which said information is embed ded in ordered sets of primitives comprising the geometric model, and
2) disembedding software for disembedding said information from said three-dimensional geometric model by detecting a geometric parameter of said three-dimensional geometric model wherein the disembedding software includes software for,
   i) searching for a start primitive, and
   ii) locating primitives in sets in accordance with the geometric parameter of said selected primitives.

* * * * *